US011731702B2

(12) United States Patent
Ohtani et al.

(10) Patent No.: US 11,731,702 B2
(45) Date of Patent: Aug. 22, 2023

(54) PARKING ASSIST APPARATUS

(71) Applicant: TOYOTA JIDOSHA KABUSHIKI KAISHA, Toyota (JP)

(72) Inventors: Shinya Ohtani, Nagakute (JP); Shinya Sannodo, Toyota (JP); Yuki Minase, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 17/354,717

(22) Filed: Jun. 22, 2021

(65) Prior Publication Data
US 2021/0316788 A1    Oct. 14, 2021

Related U.S. Application Data

(63) Continuation of application No. 16/275,447, filed on Feb. 14, 2019, now Pat. No. 11,072,367.

(30) Foreign Application Priority Data

Feb. 15, 2018  (JP) .................................. 2018-025090

(51) Int. Cl.
*B62D 6/00* (2006.01)
*B62D 15/02* (2006.01)

(52) U.S. Cl.
CPC ......... *B62D 15/0285* (2013.01); *B62D 6/001* (2013.01)

(58) Field of Classification Search
CPC .. B62D 15/0285; B62D 6/001; B62D 15/028; B62D 15/029; B60Q 9/005; B60Q 9/006; B60W 30/08
See application file for complete search history.

(56) References Cited

U.S. PATENT DOCUMENTS

2005/0049767 A1   3/2005  Endo et al.
2007/0282489 A1\*  12/2007  Boss .................. B62D 15/0285
                                                 701/2
2010/0049413 A1   2/2010  Makino et al.
(Continued)

FOREIGN PATENT DOCUMENTS

JP    2004-203359 A    7/2004
JP    2005-193698 A    7/2005
(Continued)

OTHER PUBLICATIONS

English Translation JP2006051881 (Year: 2006).

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

Provided is a steering assist apparatus configured to perform a steering assist control for changing a steering angle of a vehicle in such a manner that the vehicle moves along a target path; determine whether a newly-detected object is a stationary object or a moving object; cancel the steering assist control and inform a driver that the steering assist control is cancelled when the newly-detected object is the stationary object and a cancel condition is satisfied; pause the steering assist control and inform the driver that the steering assist control is paused when the newly-detected object is the moving object and a pause condition is satisfied; and resume the steering assist control when a resume condition is satisfied.

6 Claims, 14 Drawing Sheets

(56) References Cited

U.S. PATENT DOCUMENTS

| | | | |
|---|---|---|---|
| 2011/0251755 A1* | 10/2011 | Widmann | B62D 15/028 |
| | | | 701/36 |
| 2018/0043905 A1* | 2/2018 | Kim | B60W 50/10 |
| 2018/0194344 A1* | 7/2018 | Wang | G05D 1/0088 |
| 2019/0016345 A1 | 1/2019 | Kitagawa | |
| 2019/0248414 A1 | 8/2019 | Ohtani | |
| 2020/0189569 A1* | 6/2020 | Awan | B62D 1/00 |

FOREIGN PATENT DOCUMENTS

| | | |
|---|---|---|
| JP | 2006051881 A | 2/2006 |
| JP | 2011156955 A | 8/2011 |
| JP | 2015-003565 A | 1/2015 |
| JP | 2017-087856 A | 5/2017 |

\* cited by examiner

PARKING ASSIST APPARATUS

CLAIM OF PRIORITY

The present application is a continuation of U.S. application Ser. No. 16/275,447 filed Feb. 14, 2019 (allowed), which claims priority from Japanese patent application JP 2018-25090 filed on Feb. 15, 2018. The entire disclosures of the prior applications are considered part of the disclosure of the accompanying continuation application, and are hereby incorporated by reference.

BACKGROUND

1. Technical Field

The present disclosure relates to a steering assist apparatus configured to perform a steering assist control for assisting/supporting a steering operation of a driver when a vehicle is parked (or exits from a parking space).

2. Description of the Related Art

Hitherto, there is proposed a steering assist apparatus configured to detect a peripheral state of a vehicle by using vehicle peripheral sensors when the vehicle is parked at a predetermined position (target position), and assist a steering operation of a driver in such a manner that the vehicle moves/travels along a target path set based on the detected peripheral state.

JP 2004-203359 A (paragraphs 0046 to 0049, 0059, 0060, and the like) discloses some embodiments of the above-mentioned steering assist apparatus. One of the embodiments (third embodiment in JP 2004-203359 A, hereinafter referred to as a "first related-art apparatus") monitors whether or not a new obstacle (e.g., pedestrian) is detected in a periphery of the vehicle after a steering assist control for moving the vehicle along the target path is started. In a case where a new object is detected, when a distance between the obstacle and the vehicle becomes equal to or less than a predetermined distance threshold, the first related-art apparatus causes a speaker or a display device to generate an alert/warning that the vehicle is stopped, and then, stops the vehicle.

After the vehicle is stopped, if the obstacle moves to a position away from the vehicle within a certain time period, the first related-art apparatus resumes the steering assist control according to the target path which was used at the time point at which the vehicle is stopped. Meanwhile, if the obstacle does not move to a position away from the vehicle within the certain time period, the first related-art apparatus recalculates the target path.

Further, one of the other embodiments (second embodiment in JP 2004-203359 A, hereinafter referred to as a "second related-art apparatus") determines whether or not the vehicle gets close to the newly-detected obstacle when the vehicle moves along the target path. When it is determined that the vehicle gets close to the obstacle, the second related-art apparatus immediately cancels the steering assist control according to that target path.

The obstacle newly detected after the setting/determination of the target path is typically a moving object such as a pedestrian and a bicycle. On the other hand, at the time point of the setting/determination of the target path, there is a possibility that the vehicle peripheral sensors cannot detect all stationary objects in the periphery of the vehicle. Here, the "stationary object" means an object which does not move at all or an object which does not move for a long time. When a new obstacle is detected after the setting of the target path (in particular, after the movement of the vehicle along the target path is started), the newly-detected obstacle may be the stationary object.

However, even if the newly-detected obstacle is the stationary object, the first related-art apparatus does not recalculate the target path until the certain time period elapses. Further, there is also a high possibility that there is no path that allows the vehicle to move to the target position without coming into contact with the obstacle. In this case, it takes a long time for the driver to recognize/notice that "the vehicle cannot be parked unless the vehicle is moved from a current position of the vehicle to another position". Therefore, there arises a problem that a time required for parking the vehicle becomes long.

SUMMARY

One or more embodiments described below have been devised in view of the above-mentioned problem. Specifically, the one or more embodiments provide a steering assist apparatus capable of canceling or pausing the steering assist control depending on whether an obstacle newly detected after the setting/determination of the target path is the moving object or the stationary object, and informing the driver that the steering assist control is cancelled or paused.

There is provided an embodiment of a steering assist apparatus (hereinafter also referred to as "embodiment apparatus") applied to an own vehicle. The steering assist apparatus includes:

an information acquiring device (81, 82, 83, 84) configured to acquire vehicle peripheral information including information on an object present in a periphery of the vehicle, and information on a partition line drawn on a road in the periphery of the vehicle;

a path setting module (10, 10X) configured to set a target region based on the vehicle peripheral information, and set, as a target path, a path for moving the vehicle to the target region, the target region being a region which is occupied by the vehicle at a time point at which the vehicle completes parking or exiting from a parking space on an assumption that the vehicle moves from a current position of the vehicle; and a steering assist module (10, 10Y) configured to perform a steering assist control for changing a steering angle of the vehicle according to the set target path in such a manner that the vehicle moves along the target path.

In a case where the information acquiring device acquires, in a period from a first time point on and after a path setting time point at which the target path is set until a second time point at which the vehicle reaches the target region, information on a new object which has not been detected at the path setting time point (Step 610:Yes; or Step 1710:Yes), the steering assist module is configured to determine whether the new object is a stationary object or a moving object based on the vehicle peripheral information (Step 615).

In a case where the steering assist module determines that the new object is the stationary object (Step 615:Yes), when a cancel condition is satisfied (Step 620:Yes), the steering assist module is configured to cancel the steering assist control and inform the driver that the steering assist control is cancelled (Step 625), the cancel condition being a condition which is satisfied when there is a high possibility that the new object is an obstacle which obstructs the vehicle when the vehicle travels along the target path.

After a third time point at which the steering assist control is cancelled, the steering assist module is configured not to perform the steering assist control until the path setting module sets newly the target path and sets the target path with respect to the newly set target region.

In a case where the steering assist module determines that the new object is the moving object (Step 615:No), when a pause condition is satisfied (Step 635:Yes), the steering assist module is configured to pause the steering assist control and inform the driver that the steering assist control is paused (Step 640), the pause condition being a condition which is satisfied when there is a high possibility that the new object is an obstacle which obstructs the vehicle when the vehicle travels along the target path.

In a pause period from a fourth time point at which the pause of the steering assist control is started until a predetermined time threshold elapses, when a resume condition is satisfied (Step 720:Yes), the steering assist module is configured to resume the steering assist control in accordance with the target path used until the fourth time point at which the pause of the steering assist control is started (Step 730, Step 440), the resume condition being a condition which is satisfied when there is a high possibility that the new object is not an obstacle which obstructs the vehicle when the vehicle travels along the target path used until the fourth time point at which the pause of the steering assist control is started.

The embodiment apparatus cancels or pauses the steering assist control depending on whether an object newly detected after the setting of the target path is the moving object or the stationary object, and informs the driver that the steering assist control is cancelled or paused. It is assumed that the newly-detected object is the stationary object, and there is a high possibility that the stationary object is an obstacle which obstructs the traveling of the vehicle when the vehicle travels along the target path. In this situation, the steering assist module immediately cancels the steering assist control and informs the driver that the steering assist control is cancelled. Therefore, the driver can immediately recognize/notice that the vehicle cannot be parked unless the vehicle is moved from the current position to another position. The driver can immediately search for (find) another region in which the vehicle can be parked. As a result, the time required for parking the vehicle is shortened as compared to the first related-art apparatus.

It is assumed that the newly-detected object is the moving object, and there is a high possibility that the moving object is an obstacle which obstructs the traveling of the vehicle when the vehicle travels along the target path. In this situation, the steering assist module pauses the steering assist control, and informs the driver that the steering assist control is paused. Therefore, the driver can understand that it is not necessary to move the vehicle from the current position to another position, and it only has to wait for a while. When the predetermined resume condition is satisfied while the driver is waiting, the steering assist module resumes the steering assist control in accordance with the target path used until the fourth time point at which the pause of the steering assist control is started. As described above, the embodiment apparatus informs/notifies the driver that the steering assist control is cancelled or paused. The driver can immediately understand his/her next action (whether to search for another parking area or wait for a while).

In another aspect of the embodiment apparatus, when the steering assist module does not determine that the resume condition is satisfied in the pause period (Step 760:Yes), the steering assist module is configured to cancel the steering assist control at a time point at which the pause period elapses, and inform the driver that the steering assist control is cancelled (Step 770).

After at a time point at which the steering assist control is cancelled, the steering assist module is configured not to perform the steering assist control until the path setting module sets newly the target path and sets the target path with respect to the newly set target region.

It is assumed that the newly-detected object is the moving object, and that the moving object gets close to the target path, and then is in a stopped state near the target path. In this situation, the first related-art apparatus recalculates the target path as described above. However, there is also a high possibility that there is no path that allows the vehicle to move to the target region without coming into contact with the obstacle (moving object). For this reason, it is often necessary to move the vehicle from the current position to another position. Further, in the first related-art apparatus, the driver has to wait for the result of the recalculation of the target path. As a result, the time required for parking the vehicle becomes longer. On the other hand, in the above situation, the steering assist module according to the present aspect immediately cancels the steering assist control at the time point at which the pause period elapses, and informs the driver that the steering assist control is cancelled. Therefore, the driver can immediately search for another region in which the vehicle can be parked. As a result, the time required for parking the vehicle is shortened as compared to the first related-art apparatus.

In another aspect of the embodiment apparatus, in the case where the steering assist module determines that the new object is the stationary object, when at least part of the new object is present within a vehicle traveling area (At), the steering assist module is configured to determine that the cancel condition is satisfied, the vehicle traveling area including an area through which a vehicle body of the vehicle is expected to pass when the vehicle travels along the target path.

In the case where the steering assist module determines that the new object is the moving object, when either one of a first pause condition and a second pause condition is satisfied, the steering assist module is configured to determine that the pause condition is satisfied, the first pause condition being a condition which is satisfied when the new object is moving within the vehicle traveling area, and the second pause condition being a condition which is satisfied when the new object is moving toward the vehicle traveling area from an outside of the vehicle traveling area.

The steering assist module according to the present aspect sets the vehicle traveling area, and cancels the steering assist control based on the positional relationship between the vehicle traveling area and the stationary object. The vehicle traveling area includes the area through which the vehicle body is expected to pass when the vehicle travels along the target path. It is assumed that, although the stationary object is present within the vehicle traveling area, the stationary object is away from the vehicle. In this situation, the second related-art apparatus cancels the steering assist control when the distance between the vehicle and the stationary object is equal to or less than a predetermined distance. Therefore, a time until the steering assist control is cancelled becomes longer. Meanwhile, the steering assist module according to the present aspect immediately cancels the steering assist control in the above-mentioned situation. The driver can immediately search for another region in which the vehicle can be parked. As a result, the time required for parking the vehicle is shortened as compared to the second related-art apparatus.

Further, the steering assist module according to the present aspect pauses the steering assist control based on the positional relationship between the vehicle traveling area and the moving object, and the moving direction of the moving object. It is assumed that, although the moving object is present within the vehicle traveling area, the moving object is away from the vehicle. In this situation, the first related-art apparatus pauses the steering assist control when the distance between the vehicle and the moving object is equal to or less than the predetermined distance threshold. Therefore, the vehicle may get too close to the moving object. Meanwhile, the steering assist module according to the present aspect immediately pauses the steering assist control in the above-mentioned situation. It is possible to prevent the vehicle from getting too close to the moving object.

In another aspect of the embodiment apparatus, when either one of a first resume condition and a second resume condition is satisfied in the pause period, the steering assist module is configured to determine that the resume condition is satisfied, the first resume condition being a condition which is satisfied when the new object is moving in a direction away from the vehicle traveling area at a position outside of the vehicle traveling area, and the second resume condition being a condition which is satisfied when the new object is in a stopped state at a position outside of the vehicle traveling area.

The steering assist module according to the present aspect resumes the steering assist control based on the positional relationship between the vehicle traveling area and the moving object, and the moving direction of the moving object. It is assumed that, although the moving object moves outside of the vehicle traveling area after the steering assist control is paused, the distance between the vehicle and the moving object is still equal to or less than the predetermined distance threshold. In this situation, the first related-art apparatus cannot resume the steering assist control as long as the distance between the vehicle and the moving object is equal to or less than the predetermined distance threshold. Meanwhile, according to the present aspect, since the first resume condition is satisfied (that is, the moving object is moving in a direction away from the vehicle traveling area at a position outside of the vehicle traveling area), the steering assist module can immediately resume the steering assist control. Therefore, a time required for resuming the steering assist control is shortened as compared to the first related-art apparatus.

In another aspect of the embodiment apparatus, the path setting module is configured to, when the vehicle cannot move to the target region through one backward movement or one forward movement, set a first path (LtgtA) and a second path (LtgtB) as the target path, the first path being a path for moving the vehicle from the current position to a travel-direction-switching position for switching a travel direction of the vehicle, and the second path being a path for moving the vehicle from the travel-direction-switching position to the target region.

The path setting module is further configured to set a first vehicle traveling area (At1) and a second vehicle traveling area (At2), the first vehicle traveling area including an area through which the vehicle body is expected to pass when the vehicle travels along the first path, and the second vehicle traveling area including an area through which the vehicle body is expected to pass when the vehicle travels along the second path.

In the case where the steering assist module determines that the new object is the moving object, while the vehicle travels along the first path, when either one of a third pause condition and a fourth pause condition is satisfied, the steering assist module is configured to determine that the pause condition is satisfied, the third pause condition being a condition which is satisfied when the new object is moving within the first vehicle traveling area, and the fourth pause condition being a condition which is satisfied when the new object is moving toward the first vehicle traveling area from an outside of the first vehicle traveling area.

Further, in the case where the steering assist module determines that the new object is the moving object, while the vehicle travels along the second path, when either one of a fifth pause condition and a sixth pause condition is satisfied, the steering assist module is configured to determine that the pause condition is satisfied, the fifth pause condition being a condition which is satisfied when the new object is moving within the second vehicle traveling area, and the sixth pause condition being a condition which is satisfied when the new object is moving toward the second vehicle traveling area from an outside of the second vehicle traveling area.

When a plurality of paths (the first path and the second path) are set/determined as the target path, the steering assist module according to the present aspect sets the vehicle traveling area (that is, the first vehicle traveling area, the second vehicle traveling area) for each path. Further, the steering assist module selects the vehicle traveling area according to the path on which the vehicle is currently traveling, and determines whether or not the pause condition is satisfied. It is assumed that, when the vehicle moves along the first path, although the newly-detected object (moving object) is present within the second vehicle traveling area, the moving object is moving at a position outside of the first vehicle traveling area and in a direction away from the first vehicle traveling area. In this situation, the newly-detected object does not obstruct the traveling of the vehicle while the vehicle moves to the travel-direction-switching position. According to the present aspect, since the pause condition is not satisfied in the above-mentioned situation, the steering assist module continues performing the steering assist control. The steering assist control is not paused unnecessarily, and therefore, it is possible to reduce an opportunity for the driver to feel inconvenience.

Further features relating to the above one or more aspects of the embodiment apparatus become apparent from the description herein and the accompanying drawings. Problems, configurations, and effects other than those described above become apparent from the following description of embodiments.

In the above description, in order to facilitate understanding of the above one or more aspect of the embodiment apparatus, a name and/or reference numeral used in embodiments described below is enclosed in parentheses and assigned to each of the constituent features corresponding to the embodiments. However, each of the constituent features is not limited to the embodiments defined by the name and/or reference numeral.

DETAILED DESCRIPTION OF THE EMBODIMENTS

Now, referring to the accompanying drawings, a description is given of embodiments. The accompanying drawings are illustrations of one or more specific embodiments in conformity with the principle thereof, but those illustrations are mere examples to be used for the understanding of the embodiments, and are not to be used to limit the interpretation of the present disclosure.

First Embodiment

A steering assist apparatus (hereinafter also referred to as a "first apparatus") according to a first embodiment is applied to a vehicle. Hereinafter, the vehicle equipped with the steering assist apparatus according to each embodiment is also referred to as an "own vehicle" in order to distinguish it from other vehicles.

Figure 1:
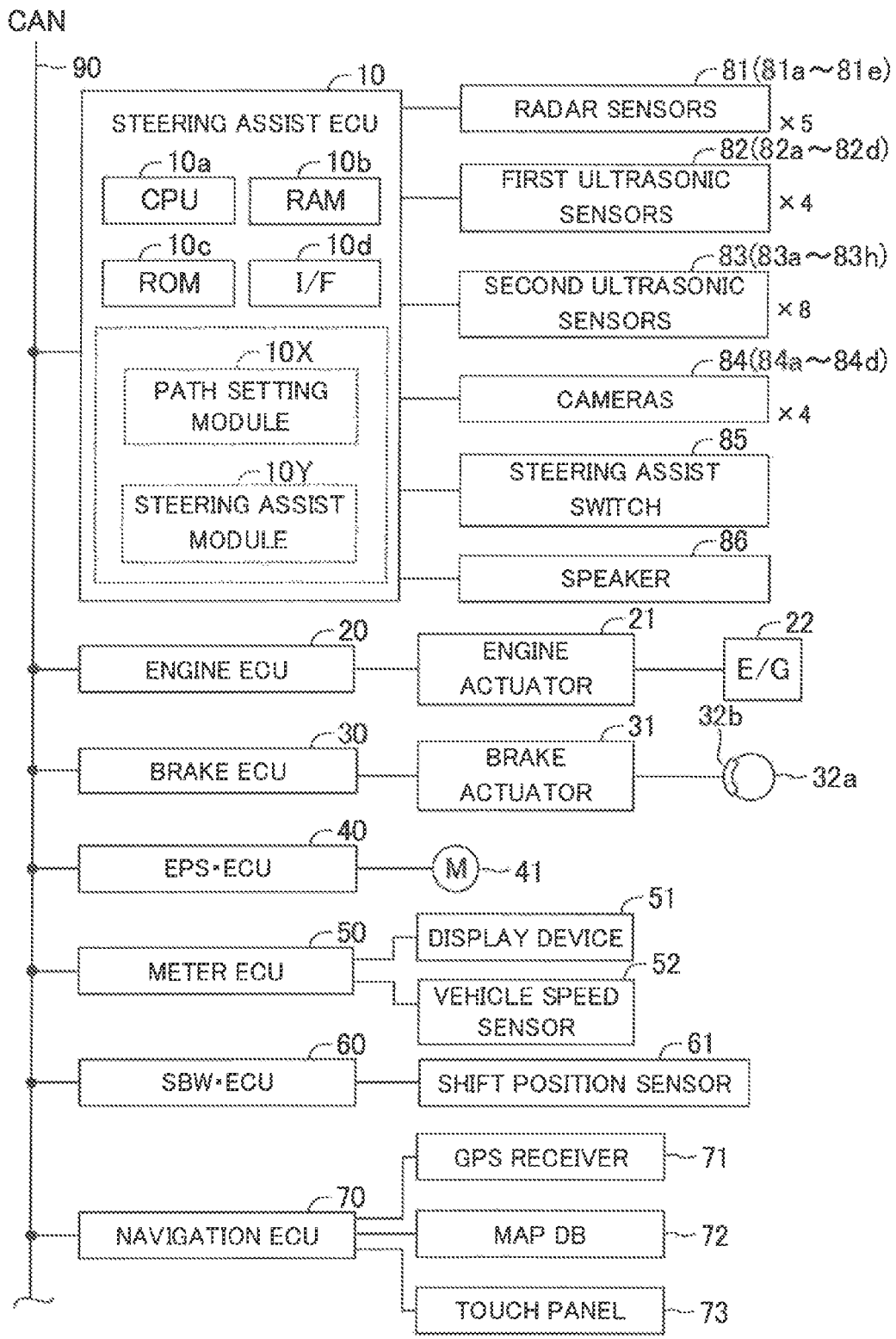
FIG. 1 is a schematic configuration diagram for illustrating a steering assist apparatus applied to a vehicle according to a first embodiment of the present disclosure.

As illustrated in FIG. 1, the steering assist apparatus includes a steering assist ECU 10. The steering assist ECU 10 includes a microcomputer including a CPU 10a, a RAM 10b, a ROM 10c, an interface (I/F) 10d, and the like. The ECU herein stands for "electric control unit". The ECU includes a microcomputer including a CPU, a RAM, a ROM, an interface, and the like. The CPU is configured to execute instructions (programs and routines) stored in the ROM to implement various functions.

The steering assist ECU 10 is connected to an engine ECU 20, a brake ECU 30, an electric power steering ECU (hereinafter referred to as an "EPS ECU") 40, a meter ECU 50, a shift-by-wire (SBW) ECU 60 and a navigation ECU 70 via a controller area network (CAN) 90. Those ECUs are connected to one another so as to be capable of mutually transmitting and receiving information via the CAN 90. Thus, a detection signal obtained by a sensor connected to a specific ECU of those ECUs is transmitted to ECUs other than the specific ECU.

The engine ECU 20 is connected to an engine actuator 21. The engine actuator 21 includes a throttle valve actuator configured to change an opening degree of a throttle valve of an internal combustion engine 22. The engine ECU 20 can change a torque generated by the internal combustion engine 22 through driving the engine actuator 21. Thus, the engine ECU 20 can control a driving force of the vehicle through controlling the engine actuator 21. When the vehicle is a hybrid vehicle, the engine ECU 20 can control a driving force of the vehicle generated by any one of or both of "an internal combustion engine and a motor" serving as vehicle driving sources. Further, when the vehicle is an electric vehicle, the engine ECU 20 can control a driving force of the vehicle generated by a motor serving as a vehicle driving source.

The brake ECU 30 is connected to a brake actuator 31. A braking force (braking torque) applied to each wheel is controlled by the brake actuator 31. The brake actuator 31 adjusts a hydraulic pressure of liquid to be supplied to wheel cylinders integrated into brake calipers 32b in accordance with an instruction from the brake ECU 30, so as to use the hydraulic pressure to press brake pads against brake discs 32a, to thereby generate friction braking forces. Thus, the brake ECU 30 can control the braking force of the vehicle through controlling the brake actuator 31.

The EPS ECU 40 is connected to an assist motor (M) 41. The assist motor 41 is integrated into a "steering mechanism including a steering wheel, a steering shaft coupled to the steering wheel, and a gear mechanism for steering" (not shown) of the vehicle. The EPS ECU 40 uses a steering torque sensor (not shown) provided in the steering shaft to detect a steering torque input to the steering wheel by the driver, to thereby drive the assist motor 41 based on the steering torque. The EPS ECU 40 applies a steering torque (steering assist torque) to the steering mechanism through the drive of the assist motor 41, to thereby assist a steering operation of the driver.

Further, when the EPS ECU 40 receives a steering command from the steering assist ECU 10 via the CAN 90 during the steering assist control described later, the EPS ECU 40 drives the assist motor 41 based on the steering torque represented by the steering command. This steering torque is different from the above-mentioned steering assist torque applied for reducing the load of the steering operation (steering wheel operation) of the driver, and therefore, is a torque applied to the steering mechanism in response to the steering command from the steering assist ECU 10 without requiring the steering operation of the driver. With this torque, a steering angle of steered wheels of the vehicle is changed (that is, the steered wheels are steered).

The meter ECU 50 is connected to a display device 51 and a vehicle speed sensor 52. The display device 51 is a multi-information display provided in front of a driver's seat. The vehicle speed sensor 51 detects a speed (traveling speed) of the vehicle and outputs a detection signal or an output signal indicative of the traveling speed. The display device 51 displays various types of information in addition to measurement values such as the traveling speed and an engine revolution speed. A head-up display may be employed as the display device 51. The vehicle speed sensor 51 transmits the detected traveling speed to the steering assist ECU 10.

The SBW ECU 60 is connected to a shift position sensor 61. The shift position sensor 61 detects a position of a shift lever serving as a movable portion of a shift operation unit. In this example, positions of the shift lever include a parking position (P), a drive position (D), and a reverse position (R). The SBW ECU 60 is configured to receive the position of the shift lever from the shift position sensor 61 to control a transmission and/or driving-direction switching mechanism (not shown) of the vehicle based on the shift lever position. That is, the SBW ECU is configured to perform a shift control for the own vehicle. More specifically, when the position of the shift lever is "P", the SBW ECU 60 controls the transmission and/or driving-direction switching mechanism in such a manner that the driving force is not transmitted to drive wheels and the vehicle is thus mechanically locked to a stop position. When the position of the shift lever is "D", the SBW ECU 60 controls the transmission and/or driving-direction switching mechanism in such a manner that the driving force for moving the vehicle forward is transmitted to the drive wheels. Further, when the position of the shift lever is "R", the SBW ECU 60 controls the transmission and/or driving-direction switching mechanism in such a manner that the driving force for moving the vehicle backward is transmitted to the drive wheels. The SBW ECU 60 is configured to output to the steering assist ECU 10 a signal indicative of the position of the shift lever received from the shift position sensor 61.

The navigation ECU 70 includes a GPS receiver 71 configured to receive a GPS signal for detecting "a latitude and a longitude" at a current position of the vehicle, a map database 72 having map information stored therein, a touch panel (touch-panel-type display device) 73, and the like. The map information stored in the map database 72 includes road information. For example, in the road information, the number of lanes included in a road, the width of the road, a gradient of the road, and the like are associated with each road section. The navigation ECU 70 executes various calculation processes based on the latitude and the longitude at a current position of the vehicle, the map information, and the like to cause the touch panel 73 to display the position of the vehicle on the map. Hereinafter, a display mode when the map and the position of the vehicle on the map are displayed on the touch panel 73 is referred to as a "navigation mode".

Further, the display mode of the touch panel 73 includes a steering assist mode in addition to the navigation mode. The steering assist mode is a display mode displayed when performing the steering assist control for parking the vehicle or exiting the vehicle from the parking space. A home button (not shown) is provided adjacent to the touch panel 73. When the display mode is the steering assist mode, as the driver depresses the home button, the display mode is switched to the navigation mode.

A plurality of radar sensors 81*a* to 81*e*, a plurality of first ultrasonic sensors 82*a* to 82*d*, a plurality of second ultrasonic sensors 83*a* to 83*h*, a plurality of cameras 84*a* to 84*d*, a steering assist switch 85, and a speaker 86 are connected to the steering assist ECU 10. The plurality of radar sensors 81*a* to 81*e* are generally referred to as "radar sensors 81". The plurality of first ultrasonic sensors 82*a* to 82*d* are generally referred to as "first ultrasonic sensors 82". The plurality of second ultrasonic sensors 83*a* to 83*h* are generally referred to as "second ultrasonic sensors 83". The plurality of cameras 84*a* to 84*d* are generally referred to as "cameras 84".

Each of the radar sensors 81 includes a radar transceiver (radar transmitting/receiving part) (not shown) and a signal processor (not shown). The radar transceiver radiates a radio wave in a millimeter waveband (hereinafter referred to as a "millimeter wave"), and receives a millimeter wave (that is, reflected wave) reflected by an object (e.g., other vehicles, pedestrian, bicycle, and building) present within a radiation range. The signal processor acquires object information based on, for example, a phase difference between the transmitted millimeter wave and the received reflected wave, an attenuation level of the reflected wave, and a time period required from transmission of the millimeter wave to reception of the reflected wave. The object information includes, for example, a distance between the vehicle and the object, a relative speed between the vehicle and the object, and a relative position (direction) of the object with respect to the vehicle. The signal processor transmits the object information as the detection signal to the steering assist ECU 10.

Figure 2:
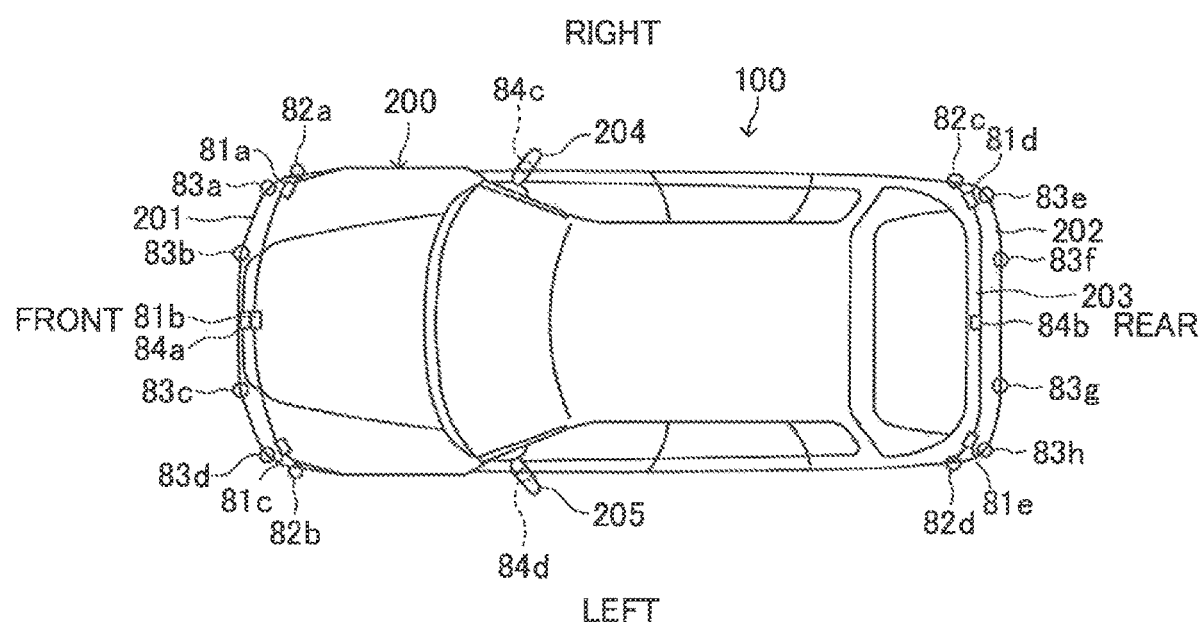
FIG. 2 is a plan view of a vehicle for illustrating an arrangement of radar sensors, first ultrasonic sensors, second ultrasonic sensors and cameras.

As illustrated in FIG. 2, the radar sensor 81*a* is disposed at a front-right corner portion of a vehicle body 200 of the vehicle 100, and mainly acquires the object information on an object present in a front-right region of the vehicle. The radar sensor 81*b* is disposed at a front-center portion of the vehicle body 200, and mainly acquires the object information on an object present in a front region of the vehicle. The radar sensor 81*c* is disposed at a front-left corner portion of the vehicle body 200, and mainly acquires the object information on an object present in a front-left region of the vehicle. The radar sensor 81*d* is disposed at a rear-right corner portion of the vehicle body 200, and mainly acquires the object information on an object present in a rear-right region of the vehicle. The radar sensor 81*e* is disposed at a rear-left corner portion of the vehicle body 200, and mainly acquires the object information on an object present in a rear-left region of the vehicle.

Each of the first ultrasonic sensors 82 and the second ultrasonic sensors 83 (hereinafter generally referred to as "ultrasonic sensors" when these sensors are not required to be distinguished from each other) transmits an ultrasonic wave having a pulse form in a predetermined range, and receives a reflected wave reflected by an object. The ultrasonic sensor detects, based on a period from the transmission of the ultrasonic wave to the reception of the ultrasonic wave, a distance between a reflection point which is a point of an object by which the transmitted ultrasonic wave is reflected, and the ultrasonic sensor. Hereinafter, this distance is referred to as a "reflection-point distance".

The first ultrasonic sensors 82 are used to detect an object at a position relatively far from the vehicle compared with the second ultrasonic sensors. As illustrated in FIG. 2, the first ultrasonic sensor 82*a* is mounted at a position on the right side of the front part of the vehicle body 200 (for example, an end on the right side of a front bumper 201), and detects the reflection-point distance with respect to an object present on the right side of the front side of the vehicle. The first ultrasonic sensor 82*b* is mounted at a position on the left side of the front part of the vehicle body 200 (for example, an end on the left side of the front bumper 201), and detects the reflection-point distance with respect to an object present on the left side of the front side of the vehicle. The first ultrasonic sensor 82*c* is mounted at a position on the right side of the rear part of the vehicle body 200 (for example, an end on the right side of a rear bumper 202), and detects the reflection-point distance with respect to an object present on the right side of the rear side of the vehicle. Further, the first ultrasonic sensor 82*d* is mounted at a position on the left side of the rear part of the vehicle body 200 (for example, an end on the left side of the rear bumper 202), and detects the reflection-point distance with respect to an object present on the left side of the rear side of the vehicle.

The second ultrasonic sensors 83 are used to detect an object at a position relatively close to the vehicle. As illustrated in FIG. 2, the four second ultrasonic sensors 83*a* to 83*d* are mounted to the front bumper 201 at intervals in a vehicle widthwise direction. The second ultrasonic sensors 83*a* to 83*d* detect the reflection-point distance with respect to an object in front of the vehicle. Further, the four second ultrasonic sensors 83*e* to 83*h* are mounted to the rear bumper 202 at intervals in the vehicle widthwise direction. The second ultrasonic sensors 83*e* to 83*h* detect the reflection-point distance with respect to an object in the back of the vehicle.

Each of the plurality of cameras 84*a* to 84*d* is a digital camera incorporating an image pickup device such as a charge coupled device (CCD) and a CMOS image sensor (CIS). Each of the cameras 84*a* to 84*d* outputs image data at a predetermined frame rate. An optical axis of each of the cameras 84*a* to 84*d* is set obliquely downward from the vehicle body of the vehicle. Thus, each of the cameras 84*a* to 84*d* picks up an image of a peripheral state of the vehicle to be checked when the vehicle is parked or exits from the parking space, and outputs data on the obtained image to the steering assist ECU 10. This data on the peripheral state of the vehicle includes the positions and shapes of partition lines, three-dimensional objects, a parking-possible region in which the vehicle can be parked, and the like.

As illustrated in FIG. 2, the camera 84*a* is mounted to substantially a center part of the front bumper 201 in the vehicle widthwise direction, and acquires image data in front of (ahead of) the vehicle. The camera 84*b* is mounted to a wall part of a rear trunk 203 in the rear part of the vehicle body 200, and acquires image data in the back of the vehicle. The camera 84*c* is mounted to a door mirror 204 on a right side of the vehicle, and acquires image data on the right side of the vehicle. The camera 84*d* is mounted to a door mirror 205 on a left side of the vehicle, and acquires image data on the left side of the vehicle.

The steering assist ECU 10 receives the detection signal from each of the radar sensors 81, the first ultrasonic sensors 82 and the second ultrasonic sensors 83 every time a predetermined period elapses. This predetermined period is referred to as a "first predetermined period" for the sake of convenience. The steering assist ECU 10 plots information (that is, the object information, the reflection point, and the reflection-point distance) included in the detection signal on a two-dimensional map. This two-dimensional map is a plan view in which the current position of the vehicle is defined as the origin, the travel direction of the vehicle is defined as the X-axis, and the left direction of the vehicle is defined as the Y-axis. The position of the vehicle is the center position of a left front wheel and a right front wheel in the plan view. The position of the vehicle may be another specific position on the vehicle (for example, the position of the center of gravity of the vehicle in the plan view or a geometric center position of the vehicle in the plan view).

The steering assist ECU 10 acquires the image data from each of the cameras 84 every time the first predetermined period elapses. The steering assist ECU 10 analyzes the image data from each of the cameras 84 to thereby detect an object which is present in the periphery of the own vehicle. Further, the steering assist ECU 10 determines/specifies the position and shape of the object with respect to the vehicle. Information on the position of the object includes a distance from the vehicle, and an azimuth direction of the object with respect to the vehicle. Further, the steering assist ECU 10 detects partition lines (including partition lines for defining a lane, and partition lines for defining a parking area) drawn/painted on a road surface around the vehicle in the image data from each of the cameras 84. The steering assist ECU 10 determines/specifies the positions and shapes of the partition lines with respect to the vehicle. Information on the position of each partition line includes a distance from the vehicle to that partition line, and an azimuth direction of that partition line with respect to the vehicle. The steering assist ECU 10 draws the object and the partition lines specified (detected) based on the image data on the above-described two-dimensional map.

The steering assist ECU 10 recognizes/detects the object present in the periphery of the vehicle (within a predetermined distance range from the position of the vehicle) based on the information shown on the two-dimensional map, and also detects a "region where no object is present" in the periphery of the vehicle. When the detected region is a region having a size and shape sufficient to park the vehicle (or exit the vehicle from the parking space), the steering assist ECU 10 determines the detected region as a "candidate region". For example, the candidate region is a rectangle which does not cross the detected partition lines. The rectangle has a long side which is longer than a longitudinal length of the vehicle by a first margin, and a short side which is longer than a length in a right-left direction of the vehicle by a second margin.

The radar sensors 81, the first ultrasonic sensors 82, the second ultrasonic sensors 83 and the cameras 84 are generally referred to as "vehicle peripheral sensors". Information obtained based on the signals from the vehicle peripheral sensors is referred to as "vehicle peripheral information". The vehicle peripheral information includes information (position and shape, etc.) on the object present in the periphery of the vehicle, and information (position and shape, etc.) on the partition line drawn on the road in the periphery of the vehicle.

The steering assist switch 85 is a switch to be operated (pressed or depressed) when the driver requests the steering assist ECU 10 to perform the steering assist control. In the present specification, the steering assist control is a well-known control for automatically steering the steering wheel to automatically change the steering angle when the vehicle is parked (or when the vehicle is caused to exit from a parking space). Therefore, a parking operation (or exit-from-parking-space operation) of the driver is assisted/supported. In addition, the steering assist control is also referred to as "IPA (Intelligent Parking Assist)". The steering assist control has one or more steering assist modes described later.

The speaker 86 produces/generates a sound when the speaker 86 receives a sound command from the steering assist ECU 10.

(Summary of Operation)

When the steering assist ECU 10 causes the vehicle on a road to be parked at a predetermined region in accordance with a perpendicular parking or a parallel parking to be described later, or causes the vehicle parked by the parallel parking to be moved from the parking space to a predetermined region on a road (that is, causes the vehicle to be exited from the parking space), the steering assist ECU 10 sets/determines a target path. Then, the steering assist ECU 10 performs an automatic steering control (that is, steering assist control) for automatically changing the steering angle of the vehicle in accordance with the target path. In this manner, the steering assist ECU 10 includes a "target path setting module (target path setting unit) 10X configured to set/determine the target path" implemented by the CPU 10*a* in terms of function. The steering assist ECU 10 further includes a "steering assist module (steering assist unit) 10Y configured to perform the automatic steering control (steering assist control) for changing the steering angle of the vehicle in accordance with the target path" implemented by the CPU 10*a* in terms of function.

After the automatic steering control is started, when the steering assist ECU 10 detects a new object which has not been detected at the time point at which the target path is set/determined, the steering assist ECU 10 determines whether the newly-detected object is a moving object or a stationary object (motionless object). The steering assist ECU 10 determines whether to satisfy a condition (a cancel position or a pause condition to be described later) depending on whether the newly-detected object is the moving object or the stationary object. When the condition is satisfied, the steering assist ECU 10 cancels (aborts) the automatic steering control before completion of that control, or pauses (temporally stops/suspends) the automatic steering control.

When the steering assist ECU 10 cancels the automatic steering control, the steering assist ECU 10 discards the target region and the target path (that is, erases/removes the target region and the target path from the RAM) at the time point at which the automatic steering control is cancelled. Therefore, the automatic steering control is not performed until the vehicle is moved to another location to thereby set/determine a new target region and a new target path. On the other hand, when the steering assist ECU 10 pauses the automatic steering control, the steering assist ECU 10 maintains (holds) the target region and the target path on and after the time point at which the pause of the automatic steering control is started. When a resume condition described later is satisfied, the steering assist ECU 10 resumes the automatic steering control by using the target region and the target path which have been maintained/held from the time point at which the pause of the automatic steering control is started.

The perpendicular parking is a parking operation of parking the own vehicle in a direction perpendicular to a travel direction of a road. The perpendicular parking is synonymous with parking the own vehicle in parallel to other parked vehicles. More specifically, the perpendicular parking is an operation of parking the own vehicle in such a manner that one side surface of the own vehicle is opposed to one side surface of another vehicle (first another vehicle), the other side surface of the own vehicle is opposed to one side surface of still another vehicle (second another vehicle), and a longitudinal axis passing through the center in the widthwise direction of the own vehicle and longitudinal axes passing through the centers in the widthwise direction of the first and second another vehicles are parallel to each other. The perpendicular parking may be an operation of parking the own vehicle in such a manner that the own vehicle is parked in the direction perpendicular to the travel direction of the road, and at least one of the left and right side surfaces of the own vehicle is opposed to a white line, a wall, a fence, a guard rail, or the like.

The parallel parking is a parking operation of parking the own vehicle in a direction parallel to the travel direction of the road. The parallel parking is synonymous with parking the own vehicle to be line with other vehicles parked along the travel direction of the road. More specifically, the parallel parking is an operation of parking the own vehicle in such a manner that the front end portion of the own vehicle is opposed to the rear end portion (or front end portion) of the first another vehicle, the rear end portion of the own vehicle is opposed to the front end portion (or rear end portion) of the second another vehicle, and the longitudinal axis passing through the center in the widthwise direction of the own vehicle and the longitudinal axes passing through the centers in the widthwise direction of the first and second another vehicles are substantially on the same line.

The steering assist ECU 10 monitors the operation of the driver with respect to steering assist switch 85, the position of the shift lever and the vehicle speed to determine whether or not a steering assist request is made/generated as described below. The steering assist request includes a perpendicular parking assist request, a parallel parking assist request, and an exit-from-parking-space assist request. When it is determined that the steering assist request is made, the display mode of the touch panel 73 is automatically changed to the steering assist mode.

Every time the steering assist switch 85 is depressed, the steering assist ECU 10 switches a switch mode to a perpendicular parking mode, a parallel parking mode, an exit-from-parking-space mode, and a non-setting mode in this order. For example, when the steering assist switch 85 is depressed once in a situation in which the switch mode is the non-setting mode, the switch mode is switched/changed to the perpendicular parking mode. When the steering assist switch 85 is depressed twice in the situation in which the switch mode is the non-setting mode, the switch mode is switched/changed to the parallel parking mode. When the steering assist switch 85 is depressed three times in the situation in which the switch mode is the non-setting mode, the switch mode is switched/changed to the exit-from-parking-space mode. When the steering assist switch 85 is depressed three times in a situation in which the switch mode is the perpendicular parking mode, the switch mode is switched/changed to the non-setting mode. The steering assist switch 85 may be a rotary or dial type switch. In this configuration, the switch mode may be switched between the perpendicular parking mode, the parallel parking mode, the exit-from-parking-space mode, and the non-setting mode depending on the rotational position of the steering assist switch 85.

<Perpendicular Parking Assist Request>

When all of the following conditions A1 to A5 are satisfied, the steering assist ECU 10 determines that the perpendicular parking assist request is made.

(Condition A1) The steering assist request (the perpendicular parking assist request, the parallel parking assist request, and the exit-from-parking-space assist request) has not been yet made/generated.

(Condition A2) the perpendicular parking mode is selected through a predetermined operation (one depression operation) of the steering assist switch 85.

(Condition A3) The position of the shift lever is the driving position (D) at the time point at which the condition A2 is satisfied.

(Condition A4) The vehicle speed is equal to or lower than a predetermined low speed threshold (for example, 30 km/h) at the time point at which the condition A2 is satisfied.

(Condition A5) The candidate region for the perpendicular parking has been detected. This region is also referred to as a "perpendicular-parking candidate region". The candidate region is a region adjacent to a road in which the vehicle travels, and the minimum distance from the current position of the vehicle to that candidate region is equal to or shorter than a predetermined distance. In addition, the candidate region has a size and shape sufficient to park the vehicle thereto through the perpendicular parking mode.

<Parallel Parking Assist Request>

When all of the following conditions B1 to B5 are satisfied, the steering assist ECU 10 determines that the parallel parking assist request is made.

(Condition B1) The steering assist request (the perpendicular parking assist request, the parallel parking assist request, and the exit-from-parking-space assist request) has not been yet made/generated.

(Condition B2) the parallel parking mode is selected through a predetermined operation (two consecutive depression operation) of the steering assist switch 85.

(Condition B3) The position of the shift lever is the driving position (D) at the time point at which the condition B2 is satisfied.

(Condition B4) The vehicle speed is equal to or lower than the predetermined low speed threshold (for example, 30 km/h) at the time point at which the condition B2 is satisfied.

(Condition B5) The candidate region for the parallel parking has been detected. This region is also referred to as a "parallel-parking candidate region". The candidate region is a region adjacent to a road in which the vehicle travels, and the minimum distance from the current position of the vehicle to that candidate region is equal to or shorter than the predetermined distance. In addition, the candidate region has a size and shape sufficient to park the vehicle thereto through the parallel parking mode.

<Exit-from-Parking-Space Assist Request>

When all of the following conditions C1 to C5 are satisfied, the steering assist ECU 10 determines that the exit-from-parking-space assist request is made.

(Condition C1) The steering assist request (the perpendicular parking assist request, the parallel parking assist request, and the exit-from-parking-space assist request) has not been yet made/generated.

(Condition C2) the exit-from-parking-space mode is selected through a predetermined operation (three consecutive depression operation) of the steering assist switch 85.

(Condition C3) The position of the shift lever is the parking position (P) at the time point at which the condition C2 is satisfied.

(Condition C4) The vehicle speed is equal to a predetermined stop speed threshold (for example, 0 km/h) at the time point at which the condition C2 is satisfied.

(Condition C5) The candidate region for exiting the vehicle from the parking space has been detected. This candidate region is referred to as an "exit-from-parking-space candidate region". The candidate region is a region of a road adjacent to the parking space in which the vehicle is parked, and has a size and shape sufficient to move the vehicle thereto through the exit-from-parking-space mode.

When the perpendicular parking assist request is made, the steering assist ECU 10 performs the automatic steering control (steering assist control) for parking the vehicle in a predetermined region in the perpendicular-parking candidate region.

When the parallel parking assist request is made, the steering assist ECU 10 performs the automatic steering control (steering assist control) for parking the vehicle in a predetermined region in the parallel-parking candidate region.

When the exit-from-parking-space assist request is made, the steering assist ECU 10 performs the automatic steering control (steering assist control) for moving the vehicle to a predetermined region in the exit-from-parking-space candidate region.

The above-mentioned automatic steering controls (steering assist controls) are similar to each other except that regions (target regions) to which the vehicle is to be finally moved are different from each other. In the following, for simplicity of explanation, it is assumed that the steering assist ECU 10 is configured to perform only the automatic steering control for the perpendicular parking assist request. By this assumption, the above condition A1 is satisfied when the perpendicular parking request has not been yet made/generated.

(Procedure)

Every time a "second predetermined period longer than the first predetermined period" elapses, the CPU 10*a* (hereinafter simply referred to as a "CPU") of the steering assist ECU 10 is configured to execute routines illustrated in FIGS. 3 to 5, respectively. Further, as described above, the CPU executes a routine (not shown), every time the first predetermined period elapses, to update the above-mentioned two-dimensional map based on the vehicle peripheral information.

Further, when an ignition switch (not shown) of the vehicle is changed from an OFF state to an ON state, the CPU executes an initialization routine (not shown) to set various flags described later to "0". The ignition switch is also referred to as a "start switch".

(Automatic Steering Control)

Figure 3:
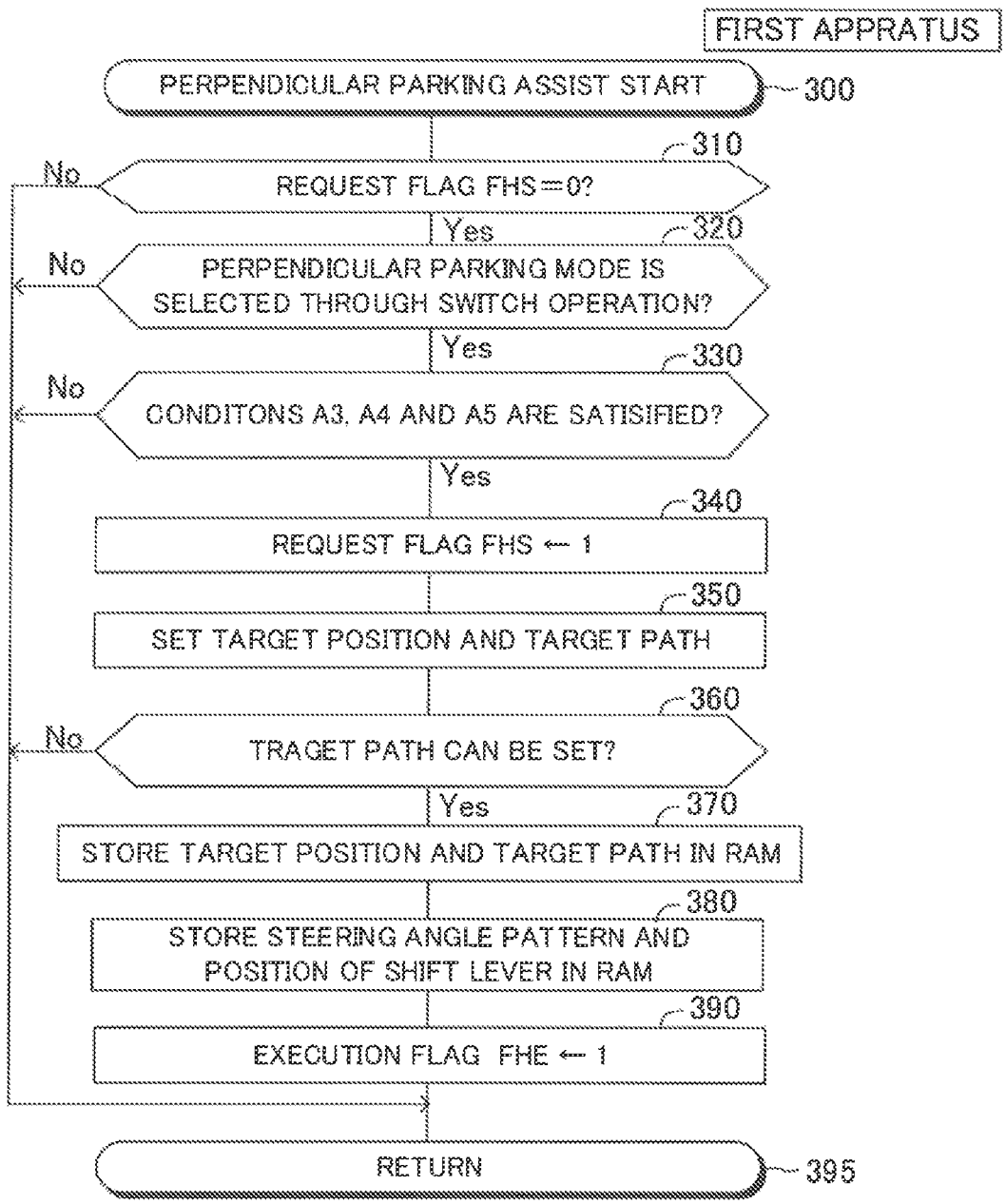
FIG. 3 is a flowchart for illustrating a "routine" to be executed by a CPU of a steering assist ECU illustrated in FIG. 1.

The CPU starts processing from Step 300 of FIG. 3 at a predetermined timing, and proceeds to Step 310 to determine whether or not a value of a perpendicular parking assist request flag FHS is "0". Hereinafter, the perpendicular parking assist request flag is simply referred to as a "request flag". When the value of the request flag FHS is "0", this indicates that the perpendicular parking assist request has not yet been made/generated at the current time point. When the value of the request flag FHS is "1", this indicates that the perpendicular parking assist request has already been made/generated. Therefore, at Step 310, the CPU determines whether or not the condition A1 is satisfied. When the value of the request flag FHS is not "0", the CPU makes a "No" determination at Step 310, and proceeds directly to Step 395 to tentatively terminate the present routine.

It is assumed that the value of the request flag FHS is "0". In this case, the CPU makes a "Yes" determination at Step 310, and proceeds to Step 320. At Step 320, the CPU determines whether or not the perpendicular parking mode is selected through the predetermined operation of the steering assist switch 85 (that is, whether or not the condition A2 is satisfied). When the perpendicular parking mode is not selected, the CPU makes a "No" determination at Step 320, and proceeds directly to Step 395 to tentatively terminate the present routine.

It is assumed that the perpendicular parking mode is selected. In this case, the CPU makes a "Yes" determination at Step 320, and proceeds to Step 330 to determine whether or not all of the conditions A3, A4 and A5 are satisfied. The conditions A3, A4 and A5 are collectively referred to as a "perpendicular-parking execution condition". When the perpendicular-parking execution condition is not satisfied, the CPU makes a "No" determination at Step 330, and proceeds directly to Step 395 to tentatively terminate the present routine.

It is assumed that the perpendicular-parking execution condition is satisfied. In this case, the CPU makes a "Yes" determination at Step 330, and sequentially executes the following processes of Steps 340 and 350, and then, proceeds to Step 360.

Step 340: the CPU sets the value of the request flag FHS to "1".

Step 350: for each of parallel-parking candidate regions which have been detected, the CPU sets, as a tentative target region, a region occupied by the vehicle body of the vehicle when it is assumed that the vehicle is parked in the parallel-parking candidate region. Further, for each tentative target region, the CPU sets, as a tentative target position, the position of the vehicle (the center position of the left front wheel and the right front wheel in the plan view) when it is assumed that the vehicle is parked in the tentative target region.

In addition, at Step 350, for each tentative target position, the CPU calculates, as a tentative target path, a path for moving the vehicle from the current position of the vehicle to the tentative target position. The target path is a path along which the vehicle can move from the current position to the target position while a predetermined clearance or more is provided/secured between the vehicle body of the vehicle and objects (for example, other vehicles, curbs, or guard rails). Therefore, the CPU sets/determines, as the tentative target path, a path for moving the vehicle from the current position to the tentative target region while maintaining the distance between the vehicle body of the vehicle and the objects at the predetermined clearance (margin clearance) or more. Depending on the situation, there may arise cases where the tentative target path cannot be set/obtained. Various methods are known to calculate the target path, and any one of the methods may be selected. For example, a calculation method for the target path proposed in Japanese Patent Application Laid-open No. 2015-3565 may be employed. When two or more tentative target paths are set/obtained, the CPU sets/determines, as a final target path, a path having the shortest distance among the tentative target paths.

Figure 8:
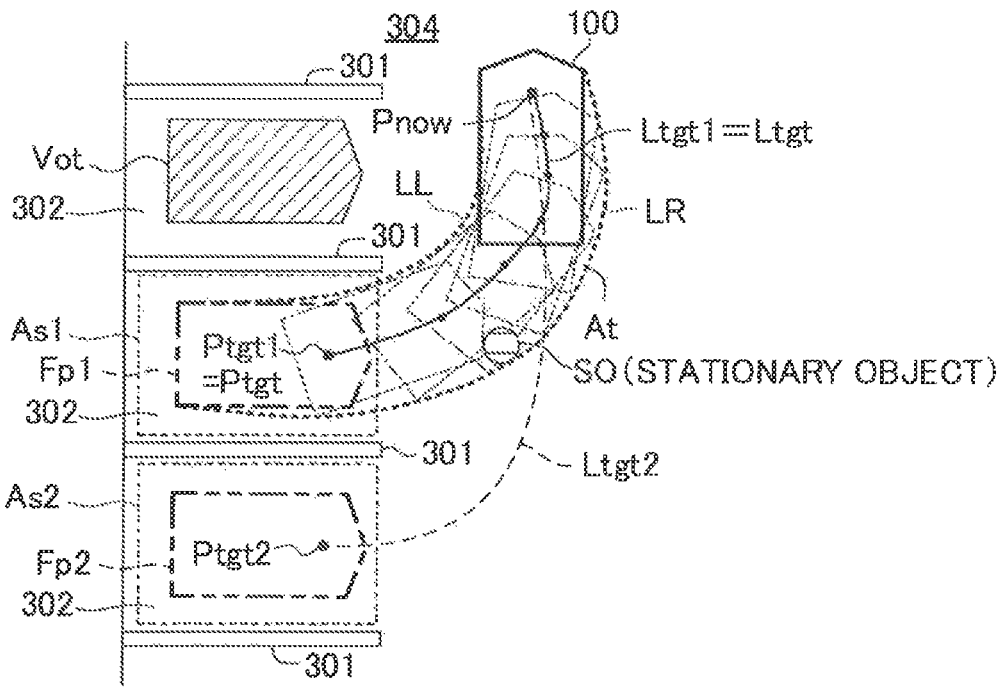
FIG. 8 is a plan view for illustrating a situation in which the steering assist ECU illustrated in FIG. 1 has detected a stationary object.

For example, in an example illustrated in FIG. 8, the vehicle 100 is present at a current position Pnow, and there are parking areas 302 partitioned by a plurality of partition lines (parking area lane marks) 301 in the periphery of the vehicle 100. The CPU has detected an other vehicle Vot as the object. The CPU has recognized that there are a perpendicular-parking candidate region As1 and a perpendicular-parking candidate region As2 in the periphery of the vehicle 100.

When the CPU proceeds to Step 350 in the routine of FIG. 3 in the above-mentioned situation, the CPU sets a tentative target region Fp1 in the perpendicular-parking candidate region As1. The CPU sets/determines, as a tentative target position Ptgt1, the position of the vehicle 100 at the time of completion of the perpendicular parking on the assumption that the vehicle 100 is parked in the tentative target region Fp1. The CPU calculates, as a tentative target path Ltgt1, a path for moving the vehicle 100 from the current position Pnow of the vehicle 100 to the tentative target position Ptgt1. In the same way, the CPU sets a tentative target region Fp2 in the perpendicular-parking candidate region As2. The CPU sets/determines, as a tentative target position Ptgt2, the position of the vehicle 100 at the time of completion of the perpendicular parking on the assumption that the vehicle 100 is parked in the tentative target region Fp2. The CPU calculates, as a tentative target path Ltgt2, a path for moving the vehicle 100 from the current position Pnow of the vehicle 100 to the tentative target position Ptgt2. Next, the CPU sets/determines, as a final target path Ltgt, the path Ltgt1 having the shortest distance among the tentative target paths Ltgt1 and Ltgt2. Therefore, the CPU sets/determines the tentative target region Fp1 as a final target region, and sets/determines the tentative target position Ptgt1 as a final target position Ptgt.

Next, the CPU proceeds to Step 360 in the routine of FIG. 3 to determine whether or not the final target path can be set (obtained/calculated). When the final target path cannot be set, the CPU makes a "No" determination at Step 360, and proceeds directly to Step 395 to tentatively terminate the present routine. In this case, the CPU may display a message: "PLEASE MOVE VEHICLE TO ANOTHER LOCATION" on a screen (for example, the touch panel 73), and return to Step 350. Further, the CPU may cause the speaker 86 to speak the message displayed on the screen.

Meanwhile, when the final target path can be set, the CPU sequentially executes the following processes of Steps 370 to 390, and then, proceeds to Step 395 to tentatively terminate the present routine.

Step 370: The CPU stores the final target region, the final target position and the final target path in the RAM 10$b$.

Step 380: The CPU sets/determines a steering angle pattern, and the direction in which the vehicle 100 is to be moved (specifically, the position of the shift lever) for moving the vehicle along the final target path", and stores data on the steering angle pattern and the position of the shift lever in the RAM 10$b$. The steering angle pattern is data that associates each position of the own vehicle on the target path with the steering angle of the vehicle at each position, and thus represents a change in the steering angle while the vehicle travels along the target path.

Step 390: The CPU sets a perpendicular parking assist execution flag FHE to "1". Hereinafter, the perpendicular parking assist execution flag is simply referred to as an "execution flag".

As described above, when the perpendicular parking assist request is made (that is, all of the conditions A1 to A5 are satisfied), the CPU sets/determines the final target region, the final target position and the final target path, and sets/determines the steering angle pattern, and the direction in which the vehicle 100 is to be moved. Further, the CPU sets the value of the execution flag FHE to "1". Hereinafter, "data on the target region, the target position, the target path, the direction in which the vehicle 100 is to be moved, and the steering angle pattern" are collectively referred to as "steering assist data".

Figure 4:
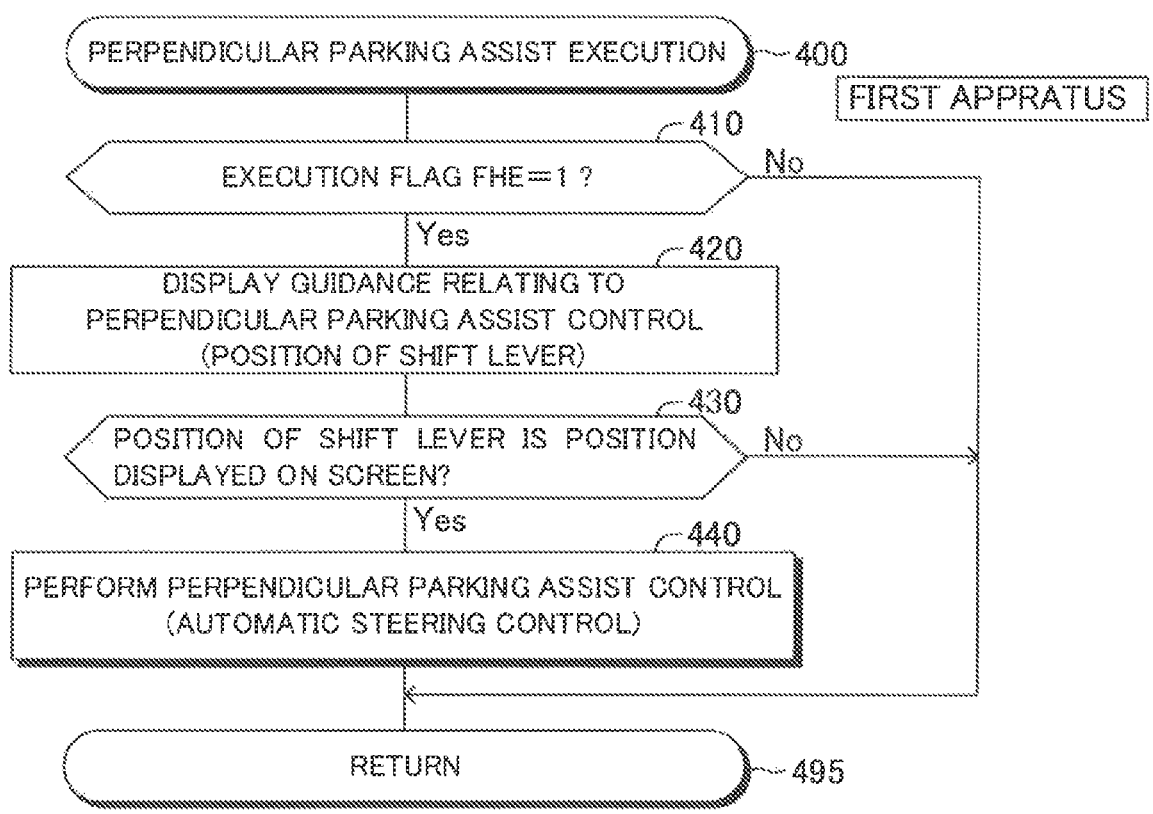
FIG. 4 is a flowchart for illustrating a "routine" to be executed by the CPU of the steering assist ECU illustrated in FIG. 1.

The CPU starts processing from Step 400 of FIG. 4 at a predetermined timing, and proceeds to Step 410 to determine whether or not the value of the execution flag FHE is "1". When the value of the execution flag FHE is not "1", the CPU makes a "No" determination at Step 410, and proceeds directly to Step 495 to tentatively terminate the present routine.

Meanwhile, when the value of the execution flag FHE is "1", the CPU makes a "Yes" determination at Step 410, and proceeds to Step 420 to display a guidance relating to the steering assist control for the perpendicular parking on the screen (the touch panel 73). Hereinafter, the steering assist control for the perpendicular parking is simply referred to as "perpendicular parking assist control". More specifically, based on the current position of the vehicle, the CPU displays the direction in which the vehicle is to be moved (specifically, the position of the shift lever) on the screen. For example, when the vehicle is to be moved backward from the current position along the target path, the CPU displays, on the screen, a guidance that the vehicle is to be moved backward (that is, a guidance for moving the position of the shift lever to the reverse position (R)). See a message 1003 illustrated in FIG. 14 described later.

Next, the CPU proceeds to Step 430 to determine whether or not the current position of the shift lever is the position displayed on the screen (position corresponding to the direction in which the vehicle is to be moved). When the current position of the shift lever is not the position displayed on the screen, the CPU makes a "No" determination at Step 430, and proceeds directly to Step 495 to tentatively terminate the present routine.

Meanwhile, when the current position of the shift lever is the position displayed on the screen, the CPU makes a "Yes" determination at Step 430, and proceeds to Step 440 to transmit a steering control signal (including a target steering angle) to the EPS ECU 40 in accordance with the steering angle pattern. The EPS ECU 40 drives the assist motor 41 in accordance with the steering control signal to make the actual steering angle of the vehicle match up with (become equal to) the target steering angle. As a result of the automatic steering control (steering assist control) being performed in this manner, it is possible to move the vehicle to the target region (that is, the target position) without operating the steering wheel by the driver. As described above, the CPU performs the perpendicular parking assist control at Step 440.

Figure 5:
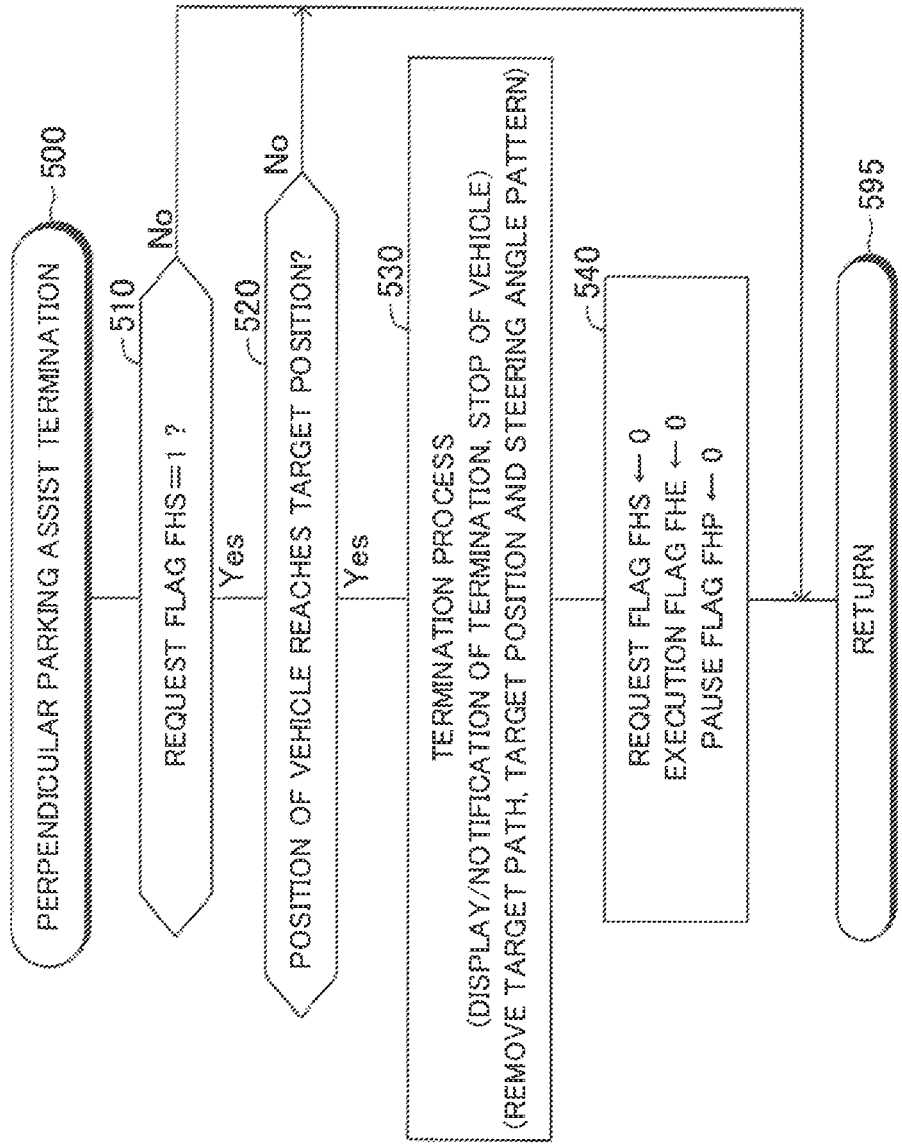
FIG. 5 is a flowchart for illustrating a "routine" to be executed by the CPU of the steering assist ECU illustrated in FIG. 1.

Further, the CPU starts processing from Step 500 of FIG. 5 at a predetermined timing, and proceeds to Step 510 to determine whether or not the value of the request flag FHS is "1". When the value of the request flag FHS is not "1", the CPU makes a "No" determination at Step 510, and proceeds directly to Step 595 to tentatively terminate the present routine.

When the value of the request flag FHS is "1", the CPU makes a "Yes" determination at Step 510, and proceeds to Step 520 to determine whether or not the position of the vehicle has reached the final target position (the vehicle has reached the final target region). When the position of the vehicle has not yet reached the final target position, the CPU makes a "No" determination at Step 520, and proceeds directly to Step 595 to tentatively terminate the present routine.

On the other hand, when the position of the vehicle has reached the final target position, the CPU makes a "Yes" determination at Step 520. Next, the CPU sequentially executes the following processes of Steps 530 and 540, and then, proceeds to Step 595 to tentatively terminate the present routine.

Step 530: the CPU executes a termination process for the perpendicular parking assist control. More specifically, the CPU displays on the screen a message that the perpendicular parking assist control is finished/completed. Further, the CPU transmits a brake control signal to the brake ECU 30 to generate the braking force to thereby stop the vehicle at the target position. In addition, the CPU removes/erases the steering assist data from the RAM 10b.

Step 540: the CPU sets the request flag FHS, the execution flag FHE, and a perpendicular parking assist pause flag FHP to "0", respectively. Hereinafter, the perpendicular parking assist pause flag is simply referred to as a "pause flag".

(Cancel Process/Pause Process)

When the CPU has detected a new object around the vehicle while the automatic steering control is being performed in accordance with the steering assist data, the CPU is configured to cancel or pause the perpendicular parking assist control. More specifically, every time the second predetermined period elapses, the CPU is configured to execute routines illustrated in FIGS. 6 and 7, respectively.

Figure 6:
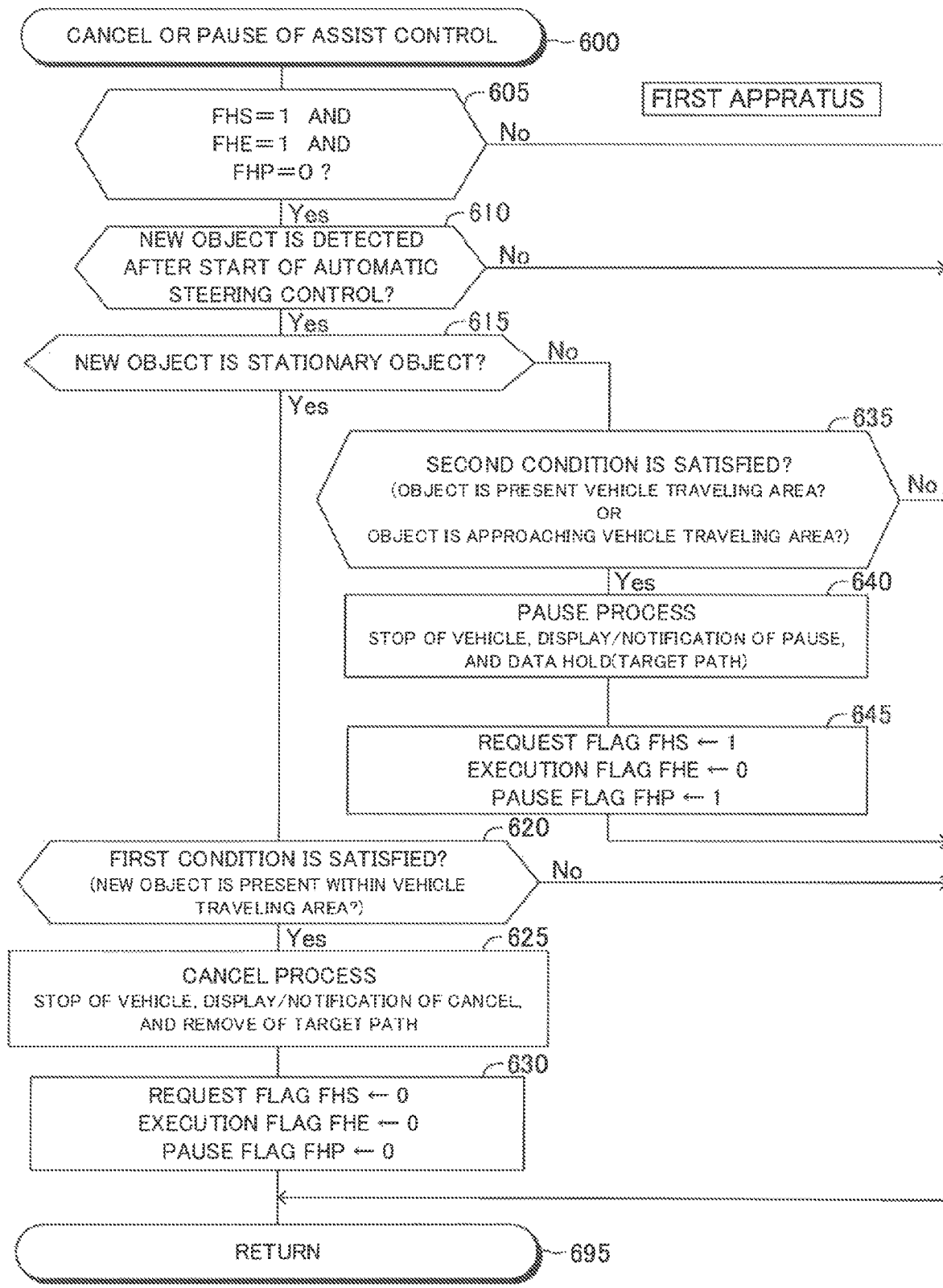
FIG. 6 is a flowchart for illustrating a "routine" to be executed by the CPU of the steering assist ECU illustrated in FIG. 1.

The CPU starts processing from Step 600 of FIG. 6 at a predetermined timing, and proceeds to Step 605 to determine whether or not all of the following conditions D1 to D3 are satisfied.

(Condition D1): the value of the request flag FHS is "1".
(Condition D2): the value of the execution flag FHS is "1".
(Condition D3): the value of the pause flag FHP is "0".

When one or more of the conditions D1 to D3 are not satisfied, the CPU makes a "No" determination at Step 605, and proceeds directly to Step 695 to tentatively terminate the present routine.

Meanwhile, when all of the conditions D1 to D3 are satisfied, the CPU makes a "Yes" determination at Step 605, and proceeds to Step 610. At Step 610, the CPU determines whether or not a new object is detected in the periphery of the vehicle based on the vehicle peripheral information after the start of the automatic steering control of Step 440. Specifically, the term "new object" means an object which has not yet been detected at a time point at which the CPU sets/determines the steering assist data (including the final target region, the final target position, the final target path, and the like). Hereinafter, the "time point at which the CPU sets/determines the steering assist data" is also referred to as a "path setting time point (or path determination time point)". In other words, the "new object" is an object which has been detected in a "specific period from a first time point on and after the path setting time point (that is, the time point at which the automatic steering control according to the steering angle pattern is started) to a second time point at which the position of the vehicle reaches the target position (that is, the vehicle reaches the target region)". As described above, the CPU determines whether or not a new object has been detected in the specific period. At Step 610, the CPU determines whether or not a new object has been detected based on the two-dimensional map created at a time point (hereinafter also referred to as "first detection time point") immediately before this time point of executing the processing of Step 610. When a new object has not been detected, the CPU makes a "No" determination at Step 610, and proceeds directly to Step 695 to tentatively terminate the present routine.

On the other hand, when a new object has been detected, the CPU makes a "Yes" determination at Step 610, and proceeds to Step 615 to determine whether or not the new object is the stationary object (motionless object). That is, the CPU determines whether the new object is the stationary object or the moving object.

More Specifically, the CPU calculates a moving speed of the new object and a moving direction of the new object based on:

(i) the two-dimensional map created at a time point (hereinafter also referred to as "the second detection time point") before the first predetermined period from the first detection time point;

(ii) the two-dimensional map created at the first detection time point;

(iii) a movement amount of the vehicle in a period from the second detection time point to the first detection time point; and (iv) a change angle of the direction of the vehicle in the period from the second detection time point to the first detection time point.

When the calculated moving speed is equal to or less than a predetermined stationary object determination threshold (substantially close to "0"), the CPU determines that the newly detected object is the stationary object. Next, the following cases will be described.

(Case 1): the new object is the stationary object (see FIG. 8).

(Case 2): the new object is the moving object (see FIGS. 9 to 13).

(Case 1): The New Object is the Stationary Object

When the CPU determines that the new object is the stationary object at Step 615, the CPU proceeds to Step 620 to determine whether or not at least part of the stationary object is present within a "vehicle traveling area". This condition as to whether the stationary object is present within the vehicle traveling area is referred to as a "first condition (or cancel condition)" for the sake of convenience.

The vehicle traveling area is an area through which the vehicle body is expected to pass when the vehicle moves to the target region along the target path. In other words, the vehicle traveling area is an area which is expected to be occupied by the vehicle body when the vehicle moves to the target region along the target path. The CPU may set the vehicle traveling area on the assumption that the width in the right-left direction of the vehicle body is larger by a predetermined length (margin) than the actual width of the vehicle body and/or the length in the longitudinal direction of the vehicle body is larger by the predetermined length (margin) than the actual length of the vehicle body. The first condition (cancel condition) is a condition which is satisfied when there is a high possibility that the "new object which is the stationary object" is an obstacle for obstructing the movement of the vehicle along the target path.

In an example of FIG. 8, a vehicle traveling area At is an area surrounded (defined) by (i) a line LL, (ii) a line LR, (iii) a front end portion of the vehicle 100 when the vehicle 100 is at the current position Pnow, and (iv) a rear end portion of the vehicle 100 when the vehicle reaches the target position Ptgt1 (=the final target position Ptgt). When the stationary object (see a stationary object SO in FIG. 8) is present in the vehicle traveling region At, the stationary object obstructs the traveling/movement of the vehicle 100 according to the perpendicular parking assist control (that is, the automatic steering control for moving the vehicle along the target path). It is considered that the stationary object does not move even after a while. Therefore, in this case, the CPU immediately cancels the perpendicular parking assist control.

More specifically, when the stationary object is present within the vehicle traveling region (that is, the first condition is satisfied), the CPU makes a "Yes" determination at Step 620. Next, the CPU sequentially executes the following processes of Steps 625 and 630, and then, proceeds to Step 695 to tentatively terminate the present routine.

Step 625: the CPU executes a cancel process for canceling the perpendicular parking assist control. Specifically, the CPU transmits the brake control signal to the brake ECU 30 to thereby stop the vehicle 100. Further, the CPU displays on the screen a message that the perpendicular parking assist control is cancelled (see a message 1005 illustrated in FIG. 14 described later). The CPU causes the speaker 86 to speak the message displayed on the screen. In addition, the CPU removes/erases the steering assist data from the RAM 10*b*.

Step 630: the CPU sets the request flag FHS, the execution flag FHE and the pause flag FHP to "0", respectively.

As a result, the driver can immediately recognize that the perpendicular parking assist control is cancelled. The perpendicular parking assist control is not restarted until the perpendicular parking mode is again selected through the predetermined operation of the steering assist switch 85 (see Steps 310 and 320 in FIG. 3, and Step 410 in FIG. 4). In other words, the CPU does not perform the automatic steering control until the target region is newly set after the time point at which the steering assist control is cancelled, and until the target path and the steering angle pattern, etc. are newly set/determined with respect to the newly set target region.

At the time point at which the CPU executes the processing of Step 620, when the stationary object is not present within the vehicle traveling area (the first condition is not satisfied), the CPU makes a "No" determination at Step 620, and proceeds directly to Step 695 to tentatively terminate the present routine.

(Case 2): The New Object is the Moving Object

When the CPU determines that the new object is the moving object at Step 615, the CPU makes a "No" determination at Step 615, and proceeds to Step 635. The CPU determines whether or not either one of the following conditions E1 and E2 is satisfied. This condition including the conditions E1 and E2 is referred to as a "second condition (or pause condition)" for the sake of convenience. The second condition (pause condition) is a condition which is satisfied when there is a high possibility that the "new object which is the moving object" is an obstacle for obstructing the movement of the vehicle along the target path.

Figure 9:
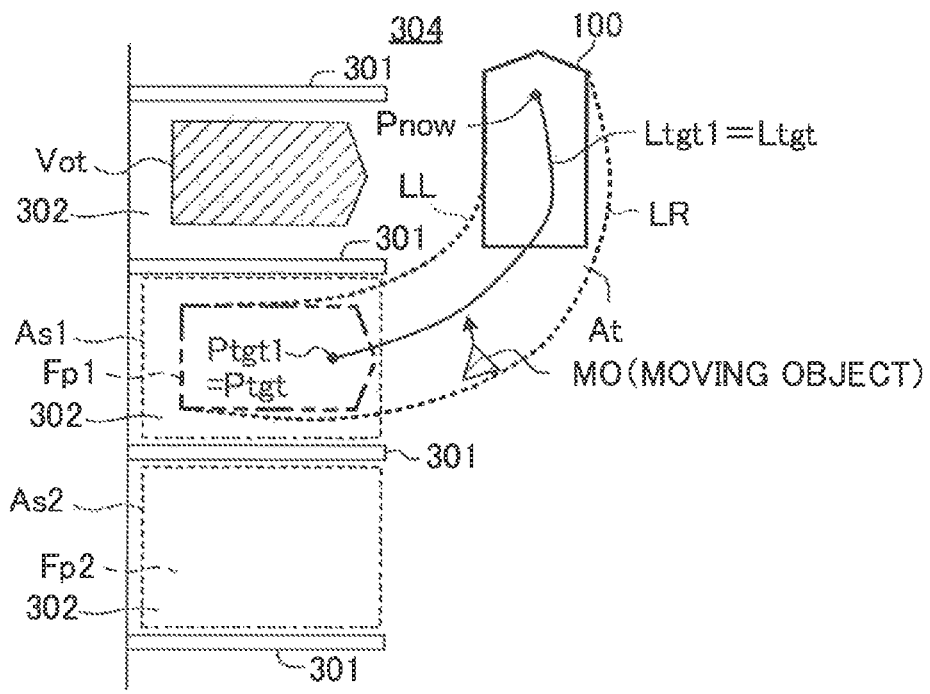
FIG. 9 is a plan view for illustrating a situation in which the steering assist ECU illustrated in FIG. 1 has detected a moving object.

(Condition E1): the new object (moving object) is present (moving) within the vehicle traveling area (see a moving object MO in FIG. 9).

Figure 10:
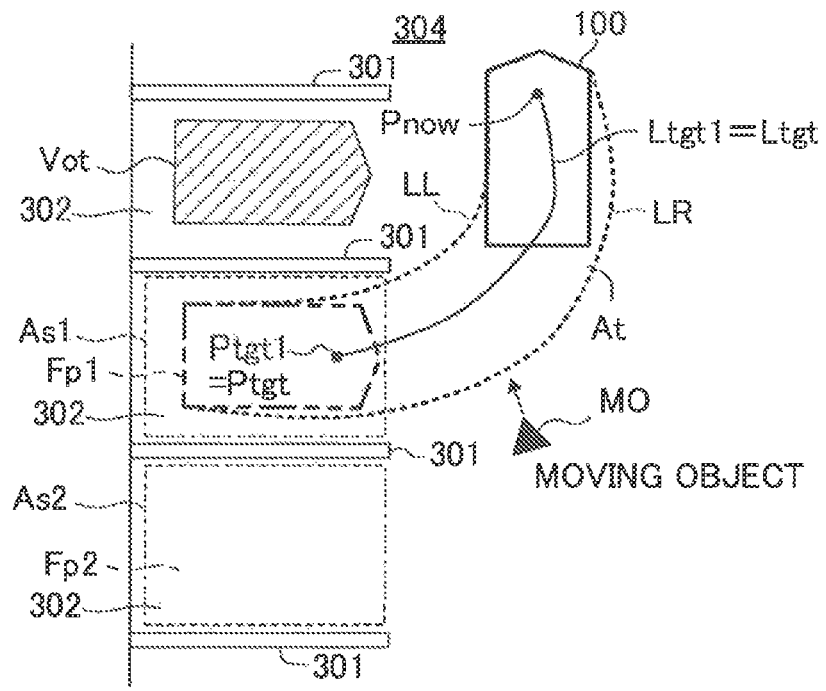
FIG. 10 is a plan view for illustrating a situation in which the steering assist ECU illustrated in FIG. 1 has detected a moving object.

(Condition E2): the new object (moving object) is moving toward the vehicle traveling area from the outside of the vehicle traveling area (see a moving object MO in FIG. 10). That is, the new object is approaching the vehicle traveling area.

The CPU sets a half line extending along the moving direction of the moving object from the current position of the moving object on the two-dimensional map. When the half line passes through the vehicle traveling region At where the vehicle is expected to travel, the CPU determines that the moving object is moving toward the vehicle traveling area At.

Figure 11:
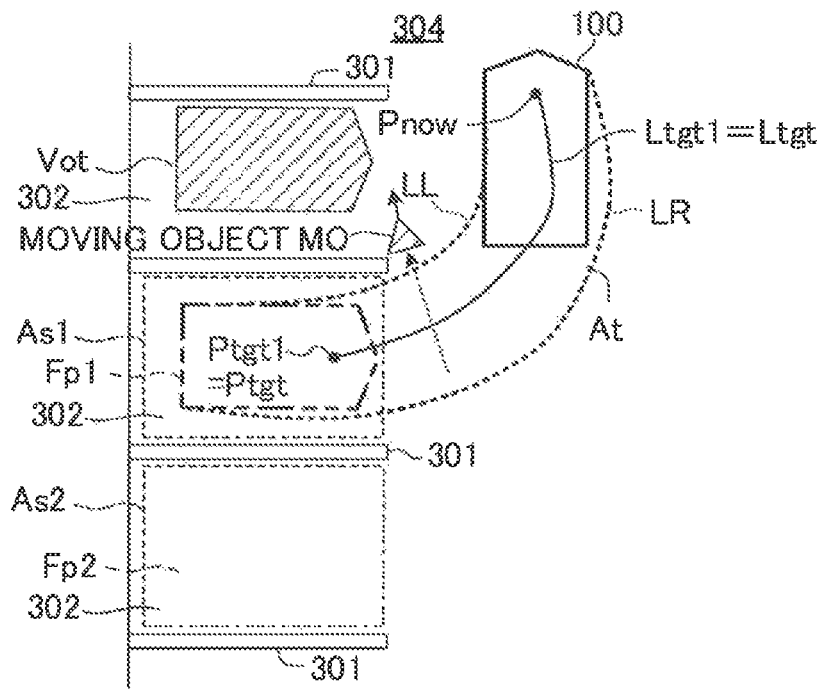
FIG. 11 is a plan view for illustrating a situation in which the steering assist ECU illustrated in FIG. 1 has detected a moving object.

When the condition E1 is satisfied, as illustrated in FIG. 9, there is a high possibility that the moving object MO obstructs the traveling/movement of the vehicle 100 according to the perpendicular parking assist control (that is, the automatic steering control for moving the vehicle along the target path). However, when a certain period of time elapses, as shown in FIG. 11, there is a possibility that the moving object MO moves to the outside of the vehicle traveling region At and moves in a direction away from the vehicle traveling region At. In the situation shown in FIG. 11, the moving object MO does not obstruct the traveling/movement of the vehicle 100 according to the perpendicular parking assist control.

Figure 12:
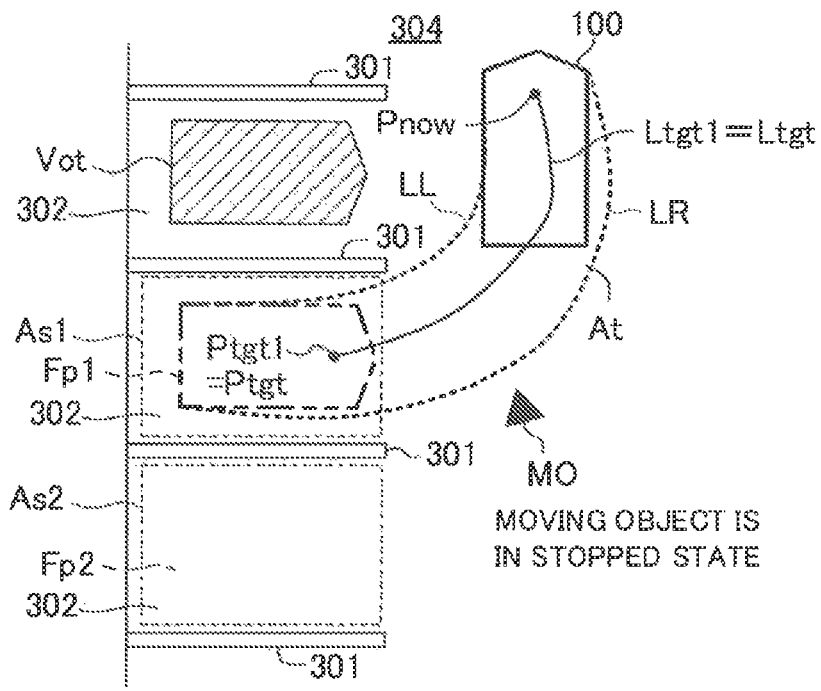
FIG. 12 is a plan view for illustrating a situation in which the steering assist ECU illustrated in FIG. 1 has detected a moving object.

When the condition E2 is satisfied, as illustrated in FIG. 10, there is a high possibility that the moving object MO obstructs the traveling/movement of the vehicle 100 according to the perpendicular parking assist control. However, when a certain period of time elapses, as shown in FIG. 12, there is a possibility that the moving object MO stops at a position outside the vehicle traveling area At before entering the vehicle traveling area At. In another case, as shown in FIG. 11, there is a possibility that the moving object MO moves to the outside of the vehicle traveling region At and moves in a direction away from the vehicle traveling region At. In these situations, the moving object MO does not obstruct the traveling/movement of the vehicle 100 according to the perpendicular parking assist control.

That is, even if the second condition is satisfied, after a certain period of time elapses, there is possibility that the second condition is not satisfied. Therefore, when the second condition is satisfied, the CPU pauses (temporarily stops) the perpendicular parking assist control in place of immediately canceling that control. In this case, the CPU maintains (holds) the steering assist data (including the final target region, the final target position, the final target path, the steering angle pattern and the like) without removing/erasing that data from RAM 10*b*.

More specifically, when the second condition is satisfied, the CPU makes a "Yes" determination at Step 635. Next, the CPU sequentially executes the following processes of Steps 640 and 645, and then, proceeds to Step 695 to tentatively terminate the present routine.

Step 640: the CPU executes a pause process for pausing the perpendicular parking assist control. Specifically, the CPU transmits the brake control signal to the brake ECU 30 to thereby stop the vehicle 100. Further, the CPU displays on the screen a message that the perpendicular parking assist control is paused (see a message 1101 illustrated in FIG. 15 described later). The CPU causes the speaker 86 to speak the message displayed on the screen. Therefore, the driver can immediately recognize that the perpendicular parking assist control is paused. In addition, the CPU maintains (holds/keeps) the steering assist data on the RAM 10*b* without erasing that data from the RAM 10*b*.

Step 645: the CPU sets the request flag FHS to "1", sets the execution flag FHE to "0", and sets the pause flag FHP to "1". In this manner, the pause flag FHP is set to "1" only when the perpendicular parking assist control is paused.

Figure 7:
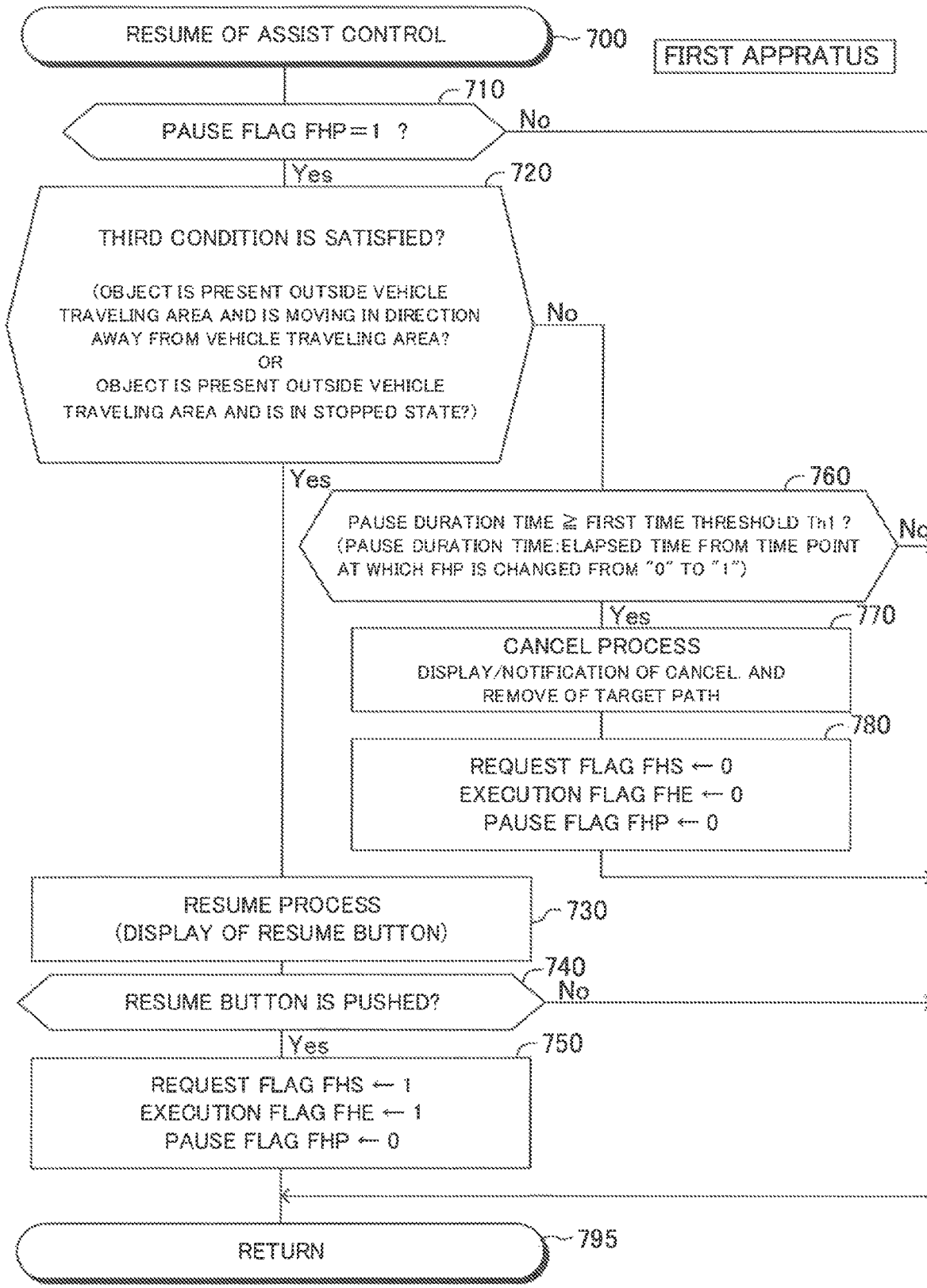
FIG. 7 is a flowchart for illustrating a "routine" to be executed by the CPU of the steering assist ECU illustrated in FIG. 1.

Further, the CPU starts processing from Step 700 of FIG. 7 at a predetermined timing, and proceeds to Step 710 to determine whether or not the value of the pause flag FHP is "1". When the value of the pause flag FHP is not "1", the CPU makes a "No" determination at Step 710, and proceeds directly to Step 795 to tentatively terminate the present routine.

Meanwhile, when the value of the pause flag FHP is "1", the CPU makes a "Yes" determination at Step 710, and proceeds to Step 720 to determine whether or not either one of the following conditions F1 and F2 is satisfied. This condition including the conditions F1 and F2 is referred to as a "third condition (or resume condition)" for the sake of convenience. The third condition (resume condition) is a condition which is satisfied when there is a high possibility that the "new object which is the moving object" is not an obstacle for obstructing the movement of the vehicle along the target path.

(Condition F1): the new object (moving object) is present at a position outside of the vehicle traveling area, and is moving in a direction away from the vehicle traveling area (see the moving object MO in FIG. 11).

(Condition F2): the new object (moving object) is present at a position outside of the vehicle traveling area, and is in a stopped state (see the moving object MO in FIG. 12).

When the third condition is satisfied, the new object (moving object) no longer be an obstacle which obstructs the movement of the vehicle 100 according to the perpendicular parking assist control. In this case, the CPU makes a "Yes" determination at Step 720, and proceeds to Step 730 to execute a resume process for resuming the perpendicular parking assist control.

Figure 16:
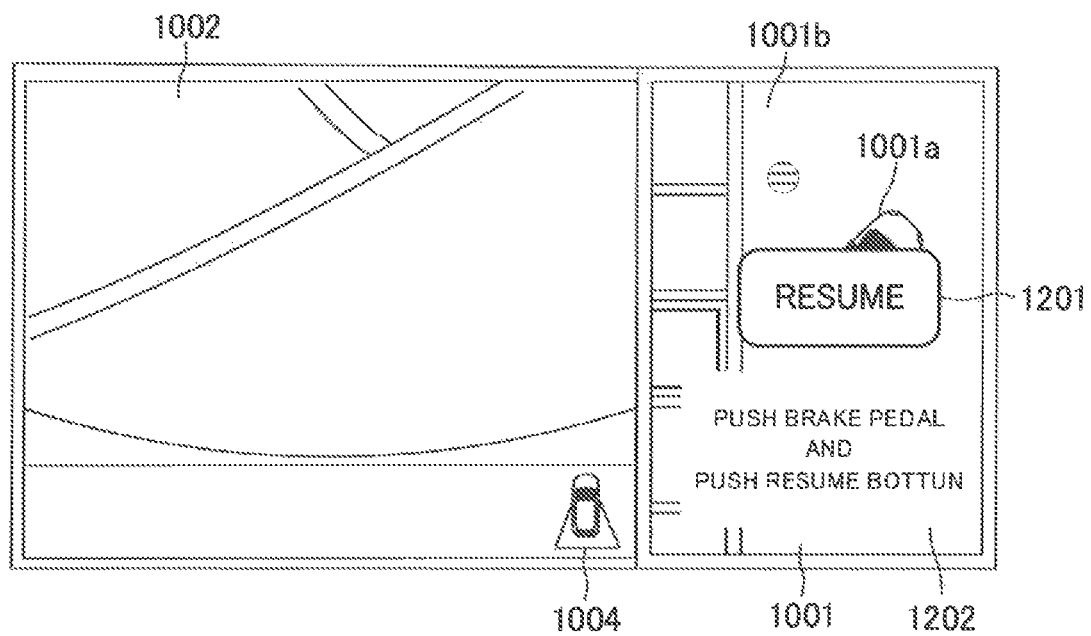
FIG. 16 is a diagram for illustrating images displayed on the touch panel illustrated in FIG. 1.

Specifically, as illustrated in FIG. 16, the CPU displays on the screen a resume button 1201 and a message 1202 that requests the driver to push a brake pedal and push the resume button. Further, the CPU causes the speaker 86 to speak the message 1202 displayed on the screen.

As the CPU proceeds to Step 740, the CPU determines whether or not the driver pushes the resume button 1201 in a state in which the driver pushes the brake pedal. That is, the CPU determines whether or not a predetermined operation (resume operation) for resuming the perpendicular parking assist control is performed by the driver. When the resume operation is not performed by the driver, the CPU makes a "No" determination at Step 740, and proceeds directly to Step 795 to tentatively terminate the present routine. As a result, since the pause flag FHP is maintained at "1", the CPU repeatedly executes the processes of Steps 710 to 740.

When the resume operation is performed by the driver, the CPU makes a "Yes" determination at Step 740, and proceeds to Step 750. At Step 750, the CPU sets the request flag FHS to "1", sets the execution flag FHE to "1", and sets the pause flag FHP to "0". In this case, the CPU stops transmitting the brake control signal to the brake ECU 30. Further, the CPU may display on the screen a message that the perpendicular parking assist control is resumed, and cause the speaker 86 to speak the message displayed on the screen.

As a result, in the routine of FIG. 3, the CPU makes a "No" determination at Step 310, and proceeds directly to Step 395. Further, in the routine of FIG. 4, the CPU makes a "Yes" determination at Step 410, and proceeds to Step 420 and the following steps. When the current position of the shift lever is the position displayed on the screen, at Step 440, the CPU resumes the automatic steering control in accordance with the steering assist data (the steering angle pattern, and the like) which has been maintained/held in the RAM 10*b*.

On the other hand, when the third condition is not satisfied at the time point at which the CPU executes the processing of Step 720 in the routine of FIG. 7, the CPU makes a "No" determination at Step 720, and proceeds to Step 760. At Step 760, the CPU determines whether or not an elapsed time from the time point at which the pause flag FHP is changed from "0" to "1" is equal to or larger than a predetermined time threshold (first time threshold) Th1. This elapsed time is an elapsed time from at the time point at which the pause of the perpendicular parking assist control is started, and is also referred to as a "pause duration time". When the pause duration time is less than the time threshold Th1, the CPU makes a "No" determination at Step 760, and proceeds directly to Step 795 to tentatively terminate the present routine. Therefore, the pause of the steering assist control is continued.

Figure 13:
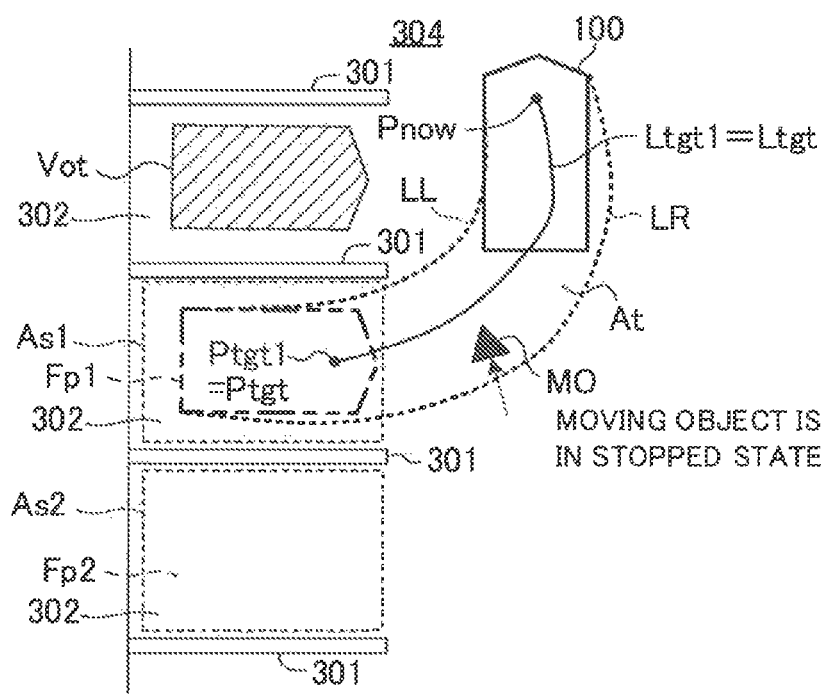
FIG. 13 is a plan view for illustrating a situation in which the steering assist ECU illustrated in FIG. 1 has detected a moving object.

For example, as illustrated in FIG. 13, it is assumed that the moving object MO enters the vehicle traveling area At, and then, the moving object MO stops at a position within the vehicle traveling area At over the time threshold Th1 or more. When the pause duration time becomes equal to or larger than the time threshold Th1, the CPU makes a "Yes" determination at Step 760. Next, the CPU sequentially executes the following processes of Steps 770 and 780, and then, proceeds to Step 795 to tentatively terminate the present routine.

Step 770: The CPU executes the cancel process for canceling the perpendicular parking assist control in the same way as the process of Step 625. Therefore, the CPU removes/erases the steering assist data from the RAM 10b.

Step 780: The CPU sets the request flag FHS, the execution flag FHE, and the pause flag FHP to "0", respectively, in the same way as the process of Step 630.

As described above, the steering assist control is cancelled at the time point at which the time threshold Th1 elapses from the time point at which the pause of the steering assist control is started. In this case, the CPU does not perform the automatic steering control (steering assist control) until the target region is newly set after the time point at which the steering assist control is cancelled, and until the steering assist data is newly set/determined with respect to the newly set target region.

Next, with reference to FIGS. 14 to 16, contents displayed on the touch panel 73 when the display mode of the image displayed on the touch panel 73 is the steering assist mode will be described. When the display mode is the steering assist mode, on the touch panel 73, an overhead view image (bird's-eye view image) 1001, a traveling direction image 1002, a travel direction message 1003 indicating a direction in which the vehicle is to be moved, and a vehicle mark 1004 are displayed.

The overhead view image 1001 is an image including an own vehicle 1001a and a peripheral region 1001b of the own vehicle 1001a. The peripheral region 1001b includes a target region 1001c corresponding to the target position, partition lines and objects present in the periphery of the own vehicle 1001a. The traveling direction image 1002 is an image of the camera corresponding to the travel direction of the vehicle. When the vehicle moves forward, the traveling direction image 1002 is an image of the camera 84a. When the vehicle moves backward, the traveling direction image 1002 is an image of the camera 84b.

The travel direction message 1003 is a message including information (that is, the position of the shift lever) on the direction in which the own vehicle is to be moved for performing the perpendicular parking assist control. The vehicle mark 1004 is a mark indicating whether the area displayed on the travel direction image 1002 is an area on the front side of the vehicle or the rear side of the vehicle.

Figure 14:
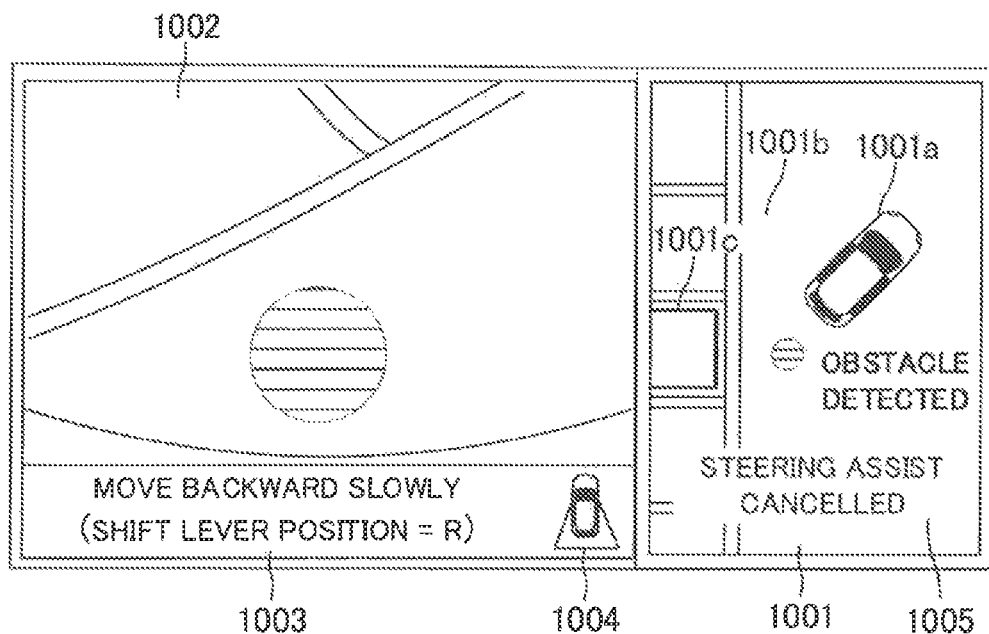
FIG. 14 is a diagram for illustrating images displayed on a touch panel illustrated in FIG. 1.

As illustrated in FIG. 14, when the steering assist control is cancelled, the CPU displays a message 1005 that the perpendicular parking assist control is cancelled so as to overlap with the overhead view image 1001.

Figure 15:
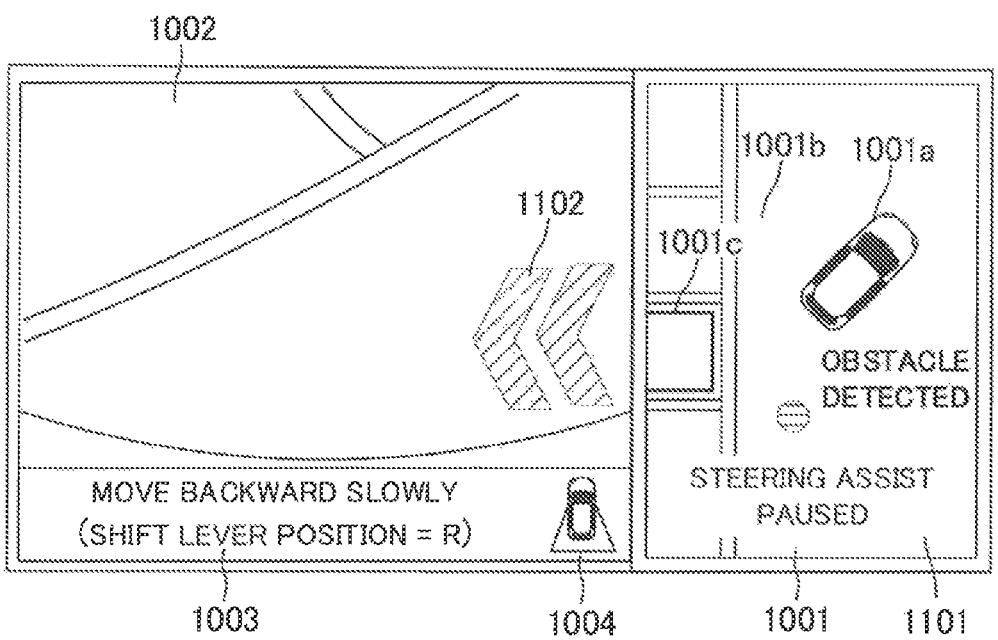
FIG. 15 is a diagram for illustrating images displayed on the touch panel illustrated in FIG. 1.

As illustrated in FIG. 15, when the steering assist control is paused, the CPU displays a message 1101 that the perpendicular parking assist control is paused so as to overlap with the overhead view image 1001. In this case, the CPU may display a mark 1102 so as to overlap with the travel direction image 1002. The mark 1102 is a mark indicating that the new object (moving object) is approaching the own vehicle from which side of the right side and the left side with respect to the own vehicle.

As illustrated in FIG. 16, when the above-mentioned third condition (resume condition) is satisfied after the steering assist control is paused, the CPU displays a resume button 1201 and a message 1202 so as to overlap with the overhead view image 1001.

As described above, when a new object is detected in a "period from the time point of the start of the automatic steering control until the position of the vehicle reaches the target position", the first apparatus determines whether the new object is the stationary object or the moving object. Further, the first apparatus cancels or pauses the steering assist control depending on whether the new object is the stationary object or the moving object, and informs the driver that the steering assist control is cancelled or paused. It is assumed that the detected new object is the stationary object, and there is a high possibility that the stationary object is an obstacle which obstructs the vehicle when the vehicle travels along the target path. In this situation, the first apparatus cancels the steering assist control and informs the driver that the steering assist control is cancelled. Therefore, the driver can immediately recognize/notice that the vehicle cannot be parked unless the vehicle is moved from the current position to another position. The driver can immediately search for another region in which the vehicle can be parked. As a result, the time required for parking the vehicle is shortened as compared to the first related-art apparatus.

It is assumed that the detected new object is the moving object, and there is a high possibility that the moving object is an obstacle which obstructs the vehicle when the vehicle travels along the target path. In this situation, the first apparatus pauses the steering assist control and informs the driver that the steering assist control is paused. Therefore, the driver can understand that it is not necessary to move the vehicle from the current position to another position, and it only has to wait for a while. When the predetermined resume condition is satisfied while the driver is waiting, the first apparatus resumes the steering assist control in accordance with the target path used until the time point at which the pause of the steering assist control is started (that is, the target path which has been maintained/held from the time point at which the steering assist control is paused).

Further, the first apparatus sets the vehicle traveling area At which is an area through which the vehicle body is expected to pass when the vehicle travels along the target path. The first apparatus determines whether or not the first condition (cancel condition) is satisfied based on the positional relationship between the vehicle traveling area At and the stationary object. It is assumed that, although the stationary object is present within the vehicle traveling area At, the stationary object is away from the vehicle. In this situation, the second related-art apparatus cancels the steering assist control when the distance between the vehicle and the stationary object is equal to or less than the predetermined distance. Therefore, the time until the steering assist control is cancelled becomes longer. Meanwhile, the first apparatus immediately cancels the steering assist control in the above-mentioned situation. The driver can immediately search for another region in which the vehicle can be parked. As a result, the time required for parking the vehicle is shortened as compared to the second related-art apparatus.

Further, the first apparatus determines whether or not the second condition (pause condition) is satisfied based on the positional relationship between the vehicle traveling area At and the moving object, and the moving direction of the moving object. It is assumed that, although the moving object is present within the vehicle traveling area At, the moving object is away from the vehicle. In this situation, the first related-art apparatus pauses the steering assist control when the distance between the vehicle and the moving object is equal to or less than the predetermined distance. Therefore, the vehicle may get too close to the moving object. Meanwhile, the first apparatus immediately pauses the steering assist control in the above-mentioned situation. It is possible to prevent the vehicle from getting too close to the moving object.

Further, the first apparatus determines whether or not the third condition (resume condition) is satisfied based on the positional relationship between the vehicle traveling area At and the moving object, and the moving direction of the moving object. It is assumed that, although the moving object moves outside of the vehicle traveling area At after the steering assist control is paused, the distance between the vehicle and the moving object is still equal to or less than the predetermined distance. In this situation, the first related-art apparatus cannot resume the steering assist control as long as the distance between the vehicle and the moving object is equal to or less than the predetermined distance. Meanwhile, because the moving object is present at a position outside of the vehicle traveling area At and the moving object is moving in a direction away from the vehicle traveling area At, the first apparatus determines that the third condition (resume condition) is satisfied, and therefore, resumes the steering assist control. As a result, a time required for resuming the steering assist control is shortened as compared to the first related-art apparatus.

Further, at the time point at which the time threshold Th1 elapses from the time point at which the pause of the steering assist control is started, the first apparatus cancels the steering assist control, and informs the driver that the steering assist control is cancelled. It is assumed that the detected new object is the moving object, and the moving object gets close to the target path and is in a stopped state near the target path. In this situation, the first related-art apparatus recalculates the target path. However, there is also a high possibility that the first related-art apparatus cannot calculate another target path which allows the vehicle to move to the target region without contacting the obstacle (moving object). Therefore, it is often necessary to move the vehicle from the current position to another position. Further, in the first related-art apparatus, the driver has to wait for the result of the recalculation of the target path. For this reason, the time required for parking the vehicle becomes longer. On the other hand, at the time point at which the time threshold Th1 elapses from the time point at which the steering assist control is paused, the first apparatus immediately cancels the steering assist control. The driver can immediately search for another region in which the vehicle can be parked. As a result, the time required for parking the vehicle is shortened as compared to the first related-art apparatus.

Second Embodiment

Figure 17:
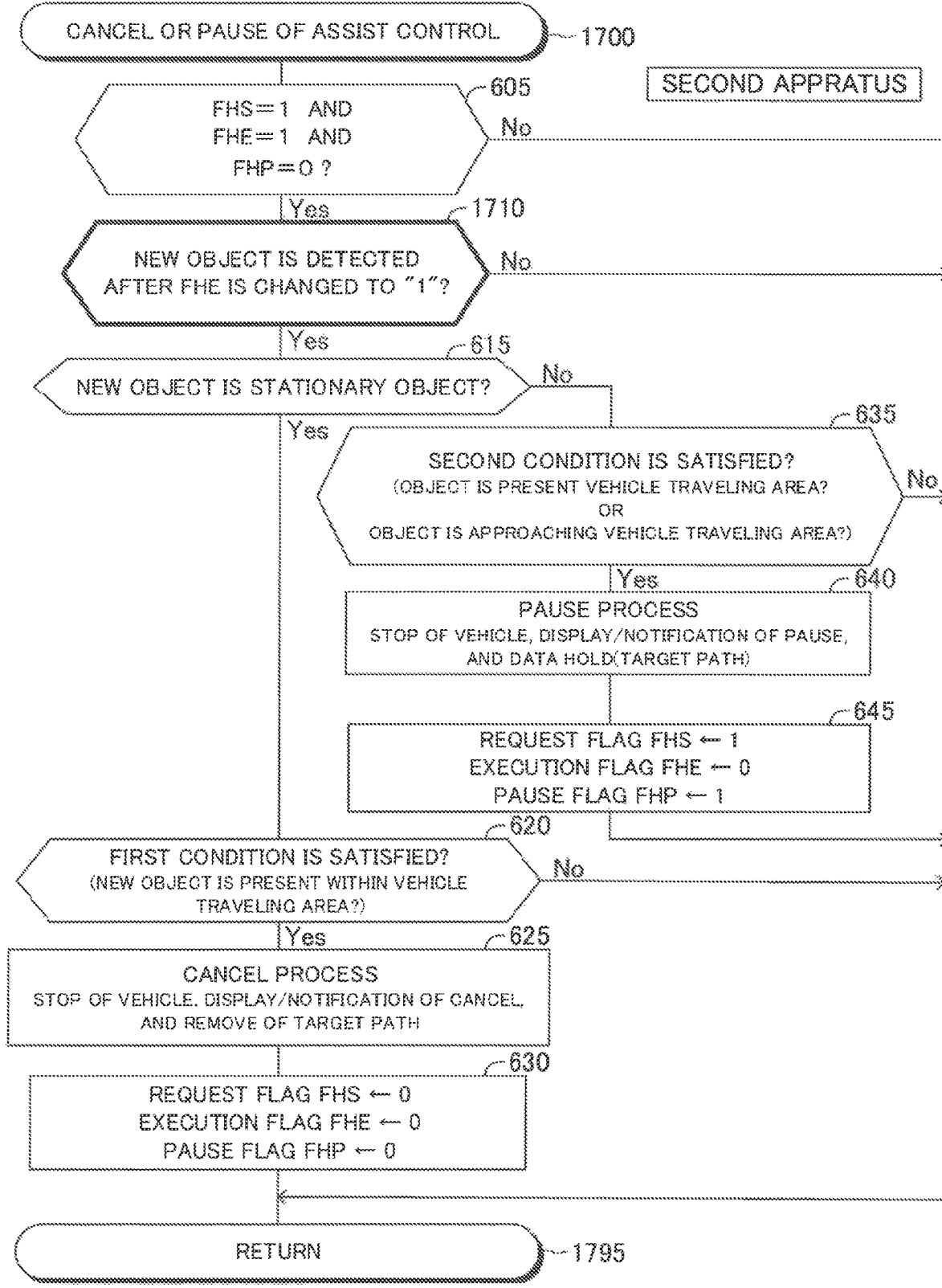
FIG. 17 is a flowchart for illustrating a "routine" to be executed by the CPU of the steering assist ECU according to a second embodiment of the present disclosure.

Next, a steering assist apparatus (hereinafter also referred to as a "second apparatus") according to a second embodiment will be described. The second apparatus is different from the first apparatus in that, when a new object is detected on and after at the path setting time point at which the final steering assist data is set/determined, even before the automatic steering control is started, the second apparatus cancels or pauses the perpendicular parking assist control in accordance with the state of the detected new object. More specifically, the second apparatus is different from the first apparatus only in that the CPU of the second apparatus executes a routine of FIG. 17 shown by a flowchart in place of the flowchart of FIG. 6. A description is now mainly given of this difference.

The routine shown in FIG. 17 is a routine in which Step 610 of the routine in FIG. 6 is replaced with Step 1710. In FIG. 17, for each step for executing the same process as the step shown in FIG. 6, the same reference numeral in FIG. 6 is appended. Therefore, detailed descriptions of Steps in FIG. 17 denoted by the same reference numerals as in FIG. 6 will be omitted.

The CPU starts processing from Step 1700 of FIG. 17 at a predetermined timing, and proceeds to Step 605. When all of the above-mentioned conditions D1 to D3 are satisfied, the CPU makes a "Yes" determination at Step 605, and proceeds to Step 1710.

At Step 1710, the CPU determines whether or not a new object has been detected after the execution flag FHE is changed to "1" (that is, in a period from the path setting time point until the time point at which the position of the vehicle reaches the target position). When a new object has not been detected, the CPU makes a "No" determination at Step 1710, and proceeds directly to Step 1795 to tentatively terminate the present routine.

On the other hand, when a new object has been detected after the execution flag FHE is changed to "1", the CPU makes a "Yes" determination at Step 1710, and executes the processes of Steps 615 to 645 as described above. Then, the CPU proceeds to Step 1795 to tentatively terminate the present routine.

It is assumed that, at the time point at which the CPU proceeds to Step 1710, the CPU proceeds to Step 430 in the routine of FIG. 4. At this time point, the direction in which the vehicle is to be moved (specifically, the position of the shift lever) is displayed on the screen. However, the driver has not yet moved the position of the shift lever to the position displayed on the screen. In this situation, the CPU makes a "No" determination at Step 430, and tentatively terminates the present routine of FIG. 4. Therefore, the perpendicular parking assist control is not started. However, a situation may occur in which a new object (moving object) gets close to the vehicle on and after the path setting time point, and before the perpendicular parking assist control is started. Even in this situation, the CPU makes a "Yes" determination at Step 1710. The CPU executes the processes of Steps 615 to 645 as described above to thereby execute the cancel process or the pause process.

The present disclosure is not limited to the above-mentioned embodiments, and various changes can be adopted within the scope of the present disclosure.

Figure 18:
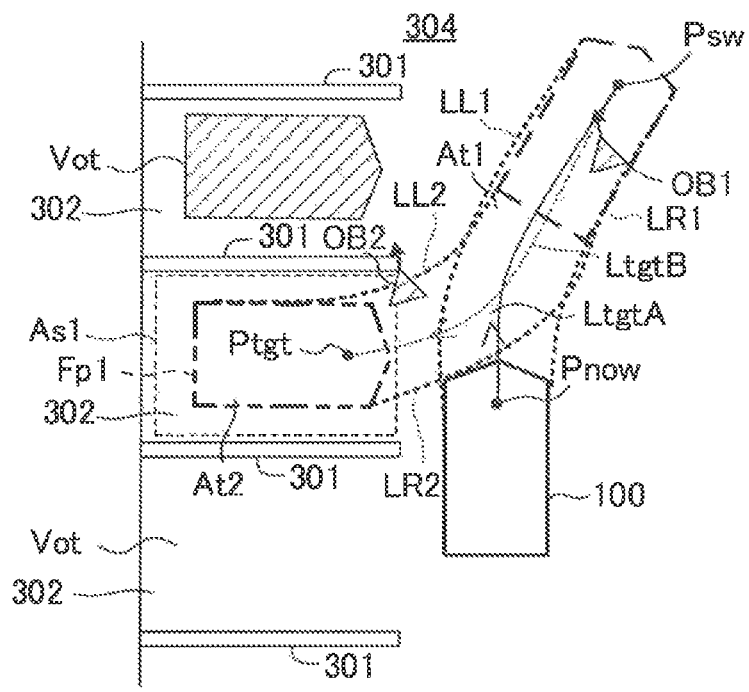
FIG. 18 is a plan view for illustrating a situation in which the steering assist ECU illustrated in FIG. 1 determines/sets a plurality of paths as a target path.

When the vehicle can move to the tentative target position through only one backward movement, the CPU may calculate, as the tentative target path, a path including a switching of the travel direction of the vehicle. Such a path may be (i) a path for moving the vehicle forward and then moving the vehicle backward, or (ii) a path for moving the vehicle backward, moving the vehicle forward, and then moving the vehicle backward. For example, as illustrated in FIG. 18, the steering assist ECU 10 calculates a first path LtgtA for moving the vehicle forward from the current position Pnow to a travel-direction-switching position Psw, and a second path LtgtB for moving the vehicle backward from the travel-direction-switching position Psw to the target position Ptgt. The travel-direction-switching position Psw is a position at which the vehicle temporarily stops in order to switch the position of the shift lever from the drive position (D) to the reverse position (R). Hereinafter, the travel-direction-switching position is simply referred to as a "switching position". The steering assist ECU 10 sets/determines the first path LtgtA and the second path LtgtB as the tentative target path.

In the above situation, the CPU sets a first vehicle traveling area At1 and a second vehicle traveling area At2. The first vehicle traveling area At1 is an area through which the vehicle body is expected to pass when the vehicle moves from the current position Pnow to the switching position Psw along the first path LtgtA. In other words, the first vehicle traveling area At1 is an area which is expected to be occupied by the vehicle body when the vehicle moves from the current position Pnow to the switching position Psw along the first path LtgtA. The first vehicle traveling area At1 is an area surrounded (defined) by (i) a line LL1, (ii) a line LR1, (iii) the front end portion of the vehicle 100 when the vehicle 100 is at the current position Pnow, and (iv) the front end portion of the vehicle 100 when the vehicle reaches the switching position Psw. The second vehicle traveling area At2 is an area through which the vehicle body is expected to pass when the vehicle moves from the switching position Psw to the target position Ptgt along the second path LtgtB. In other words, the second vehicle traveling area At2 is an area which is expected to be occupied by the vehicle body when the vehicle moves from the switching position Psw to the target position Ptgt along the second path LtgtB. The second vehicle traveling area At2 is an area surrounded (defined) by (i) a line LL2, (ii) a line LR2, (iii) the front end portion of the vehicle 100 when the vehicle 100 is at the switching position Psw, and (iv) the rear end portion of the vehicle 100 when the vehicle reaches the target position Ptgt.

In a case where the vehicle 100 moves along the first path LtgtA, when the CPU proceeds to Step 635 in the routine of FIG. 6, the CPU may determine whether or not the second condition (pause condition) is satisfied by using only the first vehicle traveling area At1. That is, when either one of the following conditions E1a and E2a is satisfied, the CPU determines that the second condition is satisfied.

(Condition E1a): the new object (moving object) is present (moving) within the first vehicle traveling area At1.

(Condition E2a): the new object (moving object) is moving toward the first vehicle traveling area At1 from the outside of the first vehicle traveling area At1.

As illustrated in FIG. 18, it is assumed that, when the vehicle 100 moves along the first path LtgtA, the CPU has newly detected a first object (moving object) OB1 in the periphery of the vehicle 100. In this situation, the first object OB1 obstructs the traveling of the vehicle 100 while the vehicle 100 moves to the switching position Psw. Since the second condition is satisfied, the CPU makes a "Yes" determination at Step 635, and then, executes the subsequent process (that is, the pause process).

On the other hand, it is assumed that, when the vehicle 100 moves along the first path LtgtA, the CPU has newly detected a second object (moving object) OB2 in the periphery of the vehicle 100. Although the second object OB1 is present within the second vehicle traveling area At2, the second object OB1 is moving at a position outside of the first vehicle traveling area At1 and moving in a direction away from the first vehicle traveling area At1. In this situation, the second object OB2 does not obstruct the traveling of the vehicle 100 while the vehicle 100 moves to the switching position Psw. In such a situation, according to this modified example, the CPU determines that the second condition is not satisfied. Therefore, the CPU continues performing the perpendicular parking assist control. The perpendicular parking assist control is not paused unnecessarily, and therefore, it is possible to reduce an opportunity for the driver to feel inconvenience.

Further, in a case where the vehicle 100 moves along the second path LtgtB, when the CPU proceeds to Step 635 in the routine of FIG. 6, the CPU may determine whether or not the second condition (pause condition) is satisfied by using only the second vehicle traveling area At2. That is, when either one of the following conditions E1b and E2b is satisfied, the CPU determines that the second condition is satisfied.

(Condition E1 b): the new object (moving object) is present (moving) within the second vehicle traveling area At2.

(Condition E2b): the new object (moving object) is moving toward the second vehicle traveling area At2 from the outside of the second vehicle traveling area At2.

The steering assist control according to the parallel parking mode and the steering assist control according to the exit-from-parking-space mode are controls similar to the perpendicular parking assist control, except that target regions to which the own vehicle is to be finally moved are different from each other. Therefore, the routines described above (the routine of FIG. 6, the routine of FIG. 7, and the routine of FIG. 17) can be applied to the steering assist control based on the parallel parking mode, and the steering assist control based on the exit-from-parking-space mode.

The cancel condition (first condition) may be a condition which is satisfied when a distance in the travel direction of the vehicle between the vehicle and the new object (stationary object) is equal to or less than a predetermined distance.

Regarding the pause condition (second condition), the condition E2 may further include the following condition: a required time Tc until the moving object reaches the vehicle traveling region At is equal to or less than a predetermined second time threshold Th2. According to this configuration, when the time until the moving object reaches the vehicle traveling region At is long, the vehicle can be moved to an position near the target position Fp without pausing the steering assist control until the moving object approaches the vehicle traveling region At. After that, the steering assist control can be paused.

The pause condition (second condition) may be a condition which is satisfied when the distance between the new object (moving object) and the vehicle is equal to or less than a predetermined distance and the moving object is approaching the vehicle.

The steering assist ECU 10 may automatically perform a shift control by using the SBW ECU 60, a driving force control by using the engine ECU 20, and a braking force control by using the brake ECU 30 in addition to the steering assist control. For example, the steering assist ECU 10 may transmit a shift control signal to the SBW ECU 60 when the vehicle reaches the switching position, to thereby cause the SBW ECU 60 to perform the shift control. Further, the steering assist ECU 10 may calculate a speed pattern for causing the vehicle to travel along the target path. The speed pattern is data that associates the position of the own vehicle on the target path and a travel speed with each other, and represents a change in the travel speed when the vehicle travels along the target path. The steering assist ECU 10 may transmit a braking force control signal to the brake ECU 30 in accordance with the speed pattern, to thereby cause the brake ECU 30 to perform the braking force control. Further, the steering assist ECU 10 may transmit a driving force control signal to the engine ECU 20 in accordance with the speed pattern, to thereby cause the engine ECU 20 to perform the driving force control.

The steering assist switch 85 is only required to be a switch to be operated when the driver requests the steering assist to generate a signal indicating the request (that is, when the steering assist request for parking the vehicle or exiting the vehicle from the parking space is made). Further, the steering assist switch may be an apparatus configured to use a speech recognition apparatus to recognize an oral (voice) request from the driver for the steering assist. This speech recognition apparatus is equivalent to a switch to be operated through speech (oral sound), and can serve as the operation switch (operation unit) in the above embodiments. In this configuration, the steering assist ECU has a request monitoring function for determining whether or not the steering assist request for parking the vehicle or exiting the vehicle from the parking space is made through the switch operation by the driver and/or the voice of the driver.

The guidance for parking the vehicle or exiting the vehicle from the parking space may be displayed on the display device 51 in place of or in addition to the touch panel 73. The meter ECU 50 may on the display device 51 display the guidance for parking the vehicle or exiting the vehicle from the parking space in accordance with a display command transmitted from the steering assist ECU 10. In addition, the display device 51 may include a display dedicated to the guidance for parking the vehicle or exiting the vehicle from the parking space.

The predetermined operation (resume operation) for resuming the perpendicular parking assist control is not limited to the above example. The resume operation may be a simple operation. For example, the resume operation may be only an operation that the driver steps on the brake pedal. Furthermore, in a configuration in which the perpendicular parking assist control further includes the driving force control using by the engine ECU 20 and the braking force control by using the brake ECU 30, the above resume operation may be omitted. In this configuration, at the time point at which the resume condition is satisfied, the perpendicular parking assist control is resumed without the resume operation by the driver.

The steering assist ECU 10 may be further configured to perform a forward-moving perpendicular parking assist control for performing the steering assist when the own vehicle is moved forward and parked in such a manner that the longitudinal direction of the own vehicle and the longitudinal direction of another vehicle are parallel to each other. In this configuration, every time the steering assist switch 85 is depressed, the steering assist ECU 10 switches the switch mode to the backward-moving perpendicular parking mode, the forward-moving perpendicular parking mode, the parallel parking mode, the exit-from-parking-space mode, and the non-setting mode in this order.

In place of the steering assist control for automatically changing the steering angle of steered wheels, the steering assist ECU 10 may instruct the driver about the steering direction of the steering wheel as the steering assist. Specifically, the steering assist ECU 10 may cause the speaker 86 to generate sound and cause the display device 51 to display a message in such a manner that the own vehicle moves along the target path.

What is claimed is:

1. A parking assist apparatus for a vehicle, comprising:
an information acquiring device configured to acquire information on an object present in a periphery of the vehicle; and
an electronic control unit including at least one processor programmed to:
set a target region, and set, as a target path, a path for moving the vehicle to the target region, the target region being a region which is occupied by the vehicle at a time point at which the vehicle completes parking or exiting from a parking space on an assumption that the vehicle moves from a current position of the vehicle; and
perform a parking assist control for changing a steering angle of the vehicle according to the set target path in such a manner that the vehicle moves along the target path,
wherein, in a case where the information acquiring device acquires, in a period from a first time point on and after a path setting time point at which the target path is set until a second time point at which the vehicle reaches the target region, information on a new object which has not been detected at the path setting time point, pause the parking assist control, when a pause condition is satisfied, the pause condition being a condition which is satisfied when the new object is on the target path, and
wherein, in a pause period from a fourth time point at which the pause of the parking assist control is started until a predetermined time threshold elapses, when a resume condition is satisfied, resume the parking assist control in accordance with the target path used until the fourth time point at which the pause of the parking assist control is started, the resume condition being a condition which is satisfied when there is a high possibility that the new object is not an obstacle which obstructs the vehicle when the vehicle travels along the target path used until the fourth time point at which the pause of the parking assist control is started.

2. The parking assist apparatus according to claim 1, wherein, when the resume condition is satisfied in the pause period, the ECU is programmed to cancel the parking assist control at a time point at which the pause period elapses, and inform the driver that the parking assist control is cancelled,
after at a time point at which the parking assist control is cancelled, the ECU is programed to not perform the parking assist control until the path setting module sets newly the target path and sets the target path with respect to the newly set target region.

3. The parking assist apparatus according to claim 1, wherein, when either one of a first resume condition and a second resume condition is satisfied in the pause period, the ECU is programmed to determine that the resume condition is satisfied, the first resume condition being a condition which is satisfied when the new object is moving in a direction away from the vehicle traveling area at a position outside of the vehicle traveling area, and the second resume condition being a condition which is satisfied when the new object is in a stopped state at a position outside of the vehicle traveling area.

4. The parking assist apparatus according to claim 1, wherein, when the pause condition is satisfied, the ECU is programmed to inform the driver that the parking assist control is paused.

5. A parking assist apparatus for a vehicle, comprising:
an information acquiring device configured to acquire information on an object present in a periphery of the vehicle; and
an electronic control unit including at least one processor programmed to:

set a target region, and set, as a target path, a path for moving the vehicle to the target region, the target region being a region which is occupied by the vehicle at a time point at which the vehicle completes parking or exiting from a parking space on an assumption that the vehicle moves from a current position of the vehicle; and perform a parking assist control for changing a steering angle of the vehicle according to the set target path in such a manner that the vehicle moves along the target path, wherein, in a case where the information acquiring device acquires, in a period from a first time point on and after a path setting time point at which the target path is set until a second time point at which the vehicle reaches the target region, information on a new object which has not been detected at the path setting time point, and wherein the new object is a moving object, pause the parking assist control when a pause condition is satisfied, the pause condition being a condition which is satisfied when the new object is on the target path, and wherein, when either one of a first pause condition and a second pause condition is satisfied, the ECU is programmed to determine that the pause condition is satisfied, the first pause condition being a condition which is satisfied when the new object is moving within a vehicle traveling area, and the second pause condition being a condition which is satisfied when the new object is moving toward the vehicle traveling area from an outside of the vehicle traveling area, the vehicle traveling area including an area through which a vehicle body of the vehicle is expected to pass when the vehicle travels along the target path.

6. The parking assist apparatus according to claim 5, wherein the ECU is programmed to, when the vehicle cannot move to the target region through one backward movement or one forward movement, set a first path and a second path as the target path, the first path being a path for moving the vehicle from the current position to a travel-direction-switching position for switching a travel direction of the vehicle, and the second path being a path for moving the vehicle from the travel-direction- switching position to the target region, and set a first vehicle traveling area and a second vehicle traveling area, the first vehicle traveling area including an area through which the vehicle body is expected to pass when the vehicle travels along the first path, and the second vehicle traveling area including an area through which the vehicle body is expected to pass when the vehicle travels along the second path, and wherein, in the case that the new object is the moving object, while the vehicle travels along the first path, when either one of a third pause condition and a fourth pause condition is satisfied, determine that the pause condition is satisfied, the third pause condition being a condition which is satisfied when the new object is moving within the first vehicle traveling area, and the fourth pause condition being a condition which is satisfied when the new object is moving toward the first vehicle traveling area from an outside of the first vehicle traveling area, and while the vehicle travels along the second path, when either one of a fifth pause condition and a sixth pause condition is satisfied, determine that the pause condition is satisfied, the fifth pause condition being a condition which is satisfied when the new object is moving within the second vehicle traveling area, and the sixth pause condition being a condition which is satisfied when the new object is moving toward the second vehicle traveling area from an outside of the second vehicle traveling area.

* * * * *